(12) United States Patent
Khoshnevisan et al.

(10) Patent No.: US 12,244,421 B2
(45) Date of Patent: Mar. 4, 2025

(54) FEEDBACK FOR MULTICAST AND BROADCAST MESSAGES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US); Le Liu, Fremont, CA (US); Kazuki Takeda, Minato-ku (JP); Alberto Rico Alvarino, San Diego, CA (US); Wanshi Chen, San Diego, CA (US); Xipeng Zhu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 17/035,459

(22) Filed: Sep. 28, 2020

(65) Prior Publication Data

US 2021/0111835 A1 Apr. 15, 2021

Related U.S. Application Data

(60) Provisional application No. 62/913,673, filed on Oct. 10, 2019.

(51) Int. Cl.
*H04L 1/16* (2023.01)
*H04L 1/1607* (2023.01)
(Continued)

(52) U.S. Cl.
CPC .......... *H04L 1/1621* (2013.01); *H04L 5/0055* (2013.01); *H04L 5/0082* (2013.01);
(Continued)

(58) Field of Classification Search
None
See application file for complete search history.

(56) References Cited

U.S. PATENT DOCUMENTS 8,023,453 B2 * 9/2011 Sammour ............. H04W 72/23
370/328
2006/0187897 A1 * 8/2006 Dabbs, III ............ H04L 12/189
370/349

(Continued)

FOREIGN PATENT DOCUMENTS

CN 101473567 A 7/2009
WO WO-2016127347 A1 8/2016

OTHER PUBLICATIONS

Xiaomi Communications, "On Procedures for 5G V2x communications", Oct. 6, 2019, 3GPP TSG RAN WG1 #98bis, R1-1911291, pp. 1-6 (Year: 2019).*

(Continued)

*Primary Examiner* — Steve R Young
(74) *Attorney, Agent, or Firm* — Holland & Hart LLP

(57) ABSTRACT

The disclosure relates to methods, devices, and systems for wireless communications. In some wireless communications systems, a base station may transmit a multicast message to a group of user equipment (UEs), and the UEs may provide feedback for the multicast message. In some implementations, the base station may configure the UEs to transmit feedback for multicast messages. In some example, the UEs may transmit group-negative acknowledgment (NACK) feedback information for multicast messages that are not successfully received at the UEs. In some other examples, each UE may be configured with UE-specific uplink control channel resources for transmitting hybrid automatic repeat request (HARQ) feedback for a multicast message. In some implementations, a UE may support feedback for both unicast and multicast messages. The semi-static codebook (Continued)

for unicast, multicast, or both may account for whether the UE is capable of concurrently receiving unicast and multicast messages in a slot.

28 Claims, 22 Drawing Sheets

(51) Int. Cl.
| | |
|---|---|
| H04L 5/00 | (2006.01) |
| H04W 8/24 | (2009.01) |
| H04W 72/02 | (2009.01) |
| H04W 72/04 | (2023.01) |
| H04W 72/0446 | (2023.01) |
| H04W 72/21 | (2023.01) |

(52) U.S. Cl.
CPC ............. *H04W 8/24* (2013.01); *H04W 72/02* (2013.01); *H04W 72/0446* (2013.01); *H04W 72/21* (2023.01)

(56) References Cited

U.S. PATENT DOCUMENTS

| | | | | |
|---|---|---|---|---|
| 2008/0031248 | A1* | 2/2008 | Vilei | H04L 1/16 370/282 |
| 2014/0185458 | A1 | 7/2014 | Yoo et al. | |
| 2018/0145839 | A1* | 5/2018 | Lee | H04L 12/189 |
| 2018/0152274 | A1 | 5/2018 | Li et al. | |
| 2019/0123923 | A1 | 4/2019 | Belleschi et al. | |
| 2019/0150122 | A1 | 5/2019 | Ying et al. | |
| 2020/0037343 | A1* | 1/2020 | He | H04L 1/1893 |
| 2020/0106566 | A1 | 4/2020 | Yeo et al. | |
| 2020/0228247 | A1 | 7/2020 | Guo et al. | |
| 2020/0344722 | A1* | 10/2020 | He | H04W 72/0446 |
| 2020/0366446 | A1 | 11/2020 | Matsumura et al. | |
| 2020/0403737 | A1 | 12/2020 | Yeo et al. | |
| 2021/0219329 | A1* | 7/2021 | Zhou | H04L 1/189 |
| 2021/0250132 | A1 | 8/2021 | Chen et al. | |
| 2021/0337527 | A1 | 10/2021 | Hui et al. | |
| 2021/0344458 | A1 | 11/2021 | Zhou | |
| 2022/0159674 | A1* | 5/2022 | Deng | H04L 5/0053 |
| 2022/0167245 | A1* | 5/2022 | Pilz | H04W 4/08 |
| 2022/0191725 | A1* | 6/2022 | Ashraf | H04L 1/1854 |
| 2022/0217506 | A1* | 7/2022 | Xu | H04W 4/06 |
| 2022/0217698 | A1* | 7/2022 | Lee | H04W 4/029 |
| 2022/0368466 | A1 | 11/2022 | Mu | |
| 2023/0091636 | A1 | 3/2023 | Khoshnevisan et al. | |

OTHER PUBLICATIONS

CATT: "Discussion on Coexistence of LTE Sidelink and NR Sidelink in NR V2X", 3GPP Draft, 3GPP TSG RAN1 Meeting #94bis, R1-1810547, 3rd Generation Partnership Project (3GPP), Mobile Competence Centre, 650, Route Des Lucioles, F-06921 Sophia-Antipolis Cedex, France, Oct. 12, 2018 (Oct. 12, 2018), pp. 1-5, XP051517955, 5 Pages, Retrieved from the Internet: URL: http://www.3gpp.org/ftp/tsg%5Fran/WG1%5FRL1/TSGR1%5F94b/Docs/R1%2D1810547%2Ezip. pg. 2, section 3.2.

Ericsson: "HARQ Procedure for SL Groupcast", 3GPP Draft, 3GPP TSG-RAN WG2 #106, R2-1907344, HARQ Procedure for SL Groupcast, 3rd Generation Partnership Project (3GPP), Mobile Competence Centre, 650, Route Des Lucioles, F-06921 Sophia-Antipolis Cedex, France, vol. RAN WG2. No. Reno. USA, May 13, 2019-May 17, 2019, May 13, 2019 (May 13, 2019), XP051730783, 4 Pages, Retrieved from the Internet: URL: http://www.3gpp.org/ftp/Meetings%5F3GPP%5FSYNC/RAN2/Docs/R2%2D1907344%2Ezip. [retrieved on May 13, 2019]p. 2. section 2. par. 1.

International Search Report and Written Opinion—PCT/US2020/053324—ISA/EPO—Mar. 31, 2021.

OPPO: "Left Issues on MAC for NR-V2X", 3GPP Draft, R2-1913941, WAS2070—Left Issues on MAC for NR-V2X, 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 7, 2019 (Oct. 7, 2019), XP051805404, 12 Pages, Retrieved from the Internet: URL: https://ftp.3gpp.org/tsg_ran/WG2_RL2/TSGR2_107bis/Docs/R2-1913941.zip. R2-1913941 was2070—Left issues on MAC or NR-V2x:-doc [retrieved on Oct. 7, 2019] p. 2, section 2.1.2, HARQ feedback enabling/disabling.

VIVO: "Physical Layer Procedure for NR Sidelink", 3GPP Draft, 3GPP TSG RAN WG1 Ad-Hoc Meeting 1901, R1-1900118, Physical Layer Procedure for NR Sidelink, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 12, 2019 (Jan. 12, 2019), XP051575742, 9 Pages, Retrieved from the Internet: URL: http://www.3gpp.org/ftp/tsg%5Fran/WG1%5FRL1/TSGR1%5FAH/NR%5FAH%5F1901/Docs/R1%2D1900118%2Ezip. [retrieved on Jan. 12, 2019] p. 3, last. par, p. 4, first par.

Xiaomi Communications: "On Procedures for 5G V2x Communications", 3GPP Draft, 3GPP TSG RAN WG1 #98bis, R1-1911291, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 6, 2019 (Oct. 6, 2019), XP051808911, 6 Pages, Retrieved from the Internet: URL: https://ftp.3gpp.org/tsg_ran/WG1_RL1/TSGR1_98b/Docs/R1-1911291.zip. R1-1911291. doc [retrieved on Oct. 6, 2019] p. 2. section 2.1. Option 1 p. 3, par. 2. Option 3 p. 3. par. 1. Option 2.

Partial International Search Report—PCT/US2020/053324—ISA/EPO—Dec. 23, 2020.

Xiaomi Communications: "On Procedures for 5G V2x Communications", 3GPP Draft, 3GPP TSG RAN WG1 #98bis, R1-1911291, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 6, 2019, XP051808911, 6 Pages.

* cited by examiner

FEEDBACK FOR MULTICAST AND BROADCAST MESSAGES

CROSS REFERENCE

The present application for patent claims the benefit of U.S. Provisional Patent Application No. 62/913,673 by KHOSHNEVISAN et al., entitled "FEEDBACK FOR MULTICAST AND BROADCAST MESSAGES," filed Oct. 10, 2019, assigned to the assignee hereof, and expressly incorporated by reference in its entirety herein.

TECHNICAL FIELD

This disclosure relates generally to wireless communications, and more specifically, to feedback for multicast and broadcast messages.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit information to multiple UEs simultaneously. For example, the base station may transmit a multicast or broadcast message on a multicast control channel (MCCH) or a multicast traffic channel (MTCH). A set of UEs monitoring the MCCH, the MTCH, or both may receive the same multicast message from the base station. However, if a UE of the set of UEs fails to receive or decode the multicast message, the failure may introduce significant latency involved in the UE successfully receiving the multicast message.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method may include receiving, from a base station, an indication of a multicast acknowledgment configuration to enable acknowledgment feedback by the UE for multicast messages; receiving, from the base station, a multicast data message; and transmitting, to the base station, an acknowledgment feedback message in response to the received multicast data message based on the received indication of the multicast acknowledgment configuration.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a base station, an indication of a multicast acknowledgment configuration to enable acknowledgment feedback by the UE for multicast messages; receive, from the base station, a multicast data message; and transmit, to the base station, an acknowledgment feedback message in response to the received multicast data message based on the received indication of the multicast acknowledgment configuration.

Another innovative aspect of the subject matter described in this disclosure can be implemented in an apparatus for wireless communications at a UE. The apparatus may include means for receiving, from a base station, an indication of a multicast acknowledgment configuration to enable acknowledgment feedback by the UE for multicast messages; means for receiving, from the base station, a multicast data message; and means for transmitting, to the base station, an acknowledgment feedback message in response to the received multicast data message based on the received indication of the multicast acknowledgment configuration.

Another innovative aspect of the subject matter described in this disclosure can be implemented in a non-transitory computer-readable medium storing code for wireless communications at a UE. The code may include instructions executable by a processor to receive, from a base station, an indication of a multicast acknowledgment configuration to enable acknowledgment feedback by the UE for multicast messages; receive, from the base station, a multicast data message; and transmit, to the base station, an acknowledgment feedback message in response to the received multicast data message based on the received indication of the multicast acknowledgment configuration.

Another innovative aspect of the subject matter described in this disclosure can be implemented in a method for wireless communications at a base station. The method may include transmitting, to a UE, an indication of a multicast acknowledgment configuration to enable acknowledgment feedback by the UE for multicast messages; transmitting, to the UE, a multicast data message; and receiving, from the UE and based on the indication of the multicast acknowledgment configuration, an acknowledgment feedback message in response to the multicast data message.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to transmit, to a UE, an indication of a multicast acknowledgment configuration to enable acknowledgment feedback by the UE for multicast messages; transmit, to the UE, a multicast data message; and receive, from the UE and based on the indication of the multicast acknowledgment configuration, an acknowledgment feedback message in response to the multicast data message.

Another innovative aspect of the subject matter described in this disclosure can be implemented in an apparatus for wireless communications at a base station. The apparatus may include means for transmitting, to a UE, an indication of a multicast acknowledgment configuration to enable acknowledgment feedback by the UE for multicast messages; means for transmitting, to the UE, a multicast data message; and means for receiving, from the UE and based on the indication of the multicast acknowledgment configuration, an acknowledgment feedback message in response to the multicast data message.

Another innovative aspect of the subject matter described in this disclosure can be implemented in a non-transitory computer-readable medium storing code for wireless communications at a base station. The code may include instructions executable by a processor to transmit, to a UE, an indication of a multicast acknowledgment configuration to enable acknowledgment feedback by the UE for multicast messages; transmit, to the UE, a multicast data message; and receive, from the UE and based on the indication of the multicast acknowledgment configuration, an acknowledgment feedback message in response to the multicast data message.

Another innovative aspect of the subject matter described in this disclosure can be implemented in a method for wireless communications at a UE. The method may include determining a set of transmission time intervals (TTIs) associated with an occasion for uplink acknowledgment feedback, the set of TTIs including at least a first TTI allocated for unicast downlink data for the UE and at least a second TTI allocated for multicast downlink data for the UE; monitoring the set of TTIs for the unicast downlink data and the multicast downlink data; determining acknowledgment information for the monitored set of TTIs according to an acknowledgment codebook that includes TTIs allocated for unicast downlink data, including the first TTI, and excludes TTIs allocated for multicast downlink data, including the second TTI; and transmitting, in the occasion for uplink acknowledgment feedback, a feedback message including the determined acknowledgment information.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to determine a set of TTIs associated with an occasion for uplink acknowledgment feedback, the set of TTIs including at least a first TTI allocated for unicast downlink data for the UE and at least a second TTI allocated for multicast downlink data for the UE; monitor the set of TTIs for the unicast downlink data and the multicast downlink data; determine acknowledgment information for the monitored set of TTIs according to an acknowledgment codebook that includes TTIs allocated for unicast downlink data, including the first TTI, and excludes TTIs allocated for multicast downlink data, including the second TTI; and transmit, in the occasion for uplink acknowledgment feedback, a feedback message including the determined acknowledgment information.

Another innovative aspect of the subject matter described in this disclosure can be implemented in an apparatus for wireless communications at a UE. The apparatus may include means for determining a set of TTIs associated with an occasion for uplink acknowledgment feedback, the set of TTIs including at least a first TTI allocated for unicast downlink data for the UE and at least a second TTI allocated for multicast downlink data for the UE; means for monitoring the set of TTIs for the unicast downlink data and the multicast downlink data; means for determining acknowledgment information for the monitored set of TTIs according to an acknowledgment codebook that includes TTIs allocated for unicast downlink data, including the first TTI, and excludes TTIs allocated for multicast downlink data, including the second TTI; and means for transmitting, in the occasion for uplink acknowledgment feedback, a feedback message including the determined acknowledgment information.

Another innovative aspect of the subject matter described in this disclosure can be implemented in a non-transitory computer-readable medium storing code for wireless communications at a UE. The code may include instructions executable by a processor to determine a set of TTIs associated with an occasion for uplink acknowledgment feedback, the set of TTIs including at least a first TTI allocated for unicast downlink data for the UE and at least a second TTI allocated for multicast downlink data for the UE; monitor the set of TTIs for the unicast downlink data and the multicast downlink data; determine acknowledgment information for the monitored set of TTIs according to an acknowledgment codebook that includes TTIs allocated for unicast downlink data, including the first TTI, and excludes TTIs allocated for multicast downlink data, including the second TTI; and transmit, in the occasion for uplink acknowledgment feedback, a feedback message including the determined acknowledgment information.

Another innovative aspect of the subject matter described in this disclosure can be implemented in a method for wireless communications at a base station. The method may include transmitting, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE; transmitting, to the UE, a unicast downlink data message in the first TTI; and receiving, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to transmit, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE; transmit, to the UE, a unicast downlink data message in the first TTI; and receive, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI.

Another innovative aspect of the subject matter described in this disclosure can be implemented in an apparatus for wireless communications at a base station. The apparatus may include means for transmitting, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE; means for transmitting, to the UE, a unicast downlink data message in the first TTI; and means for receiving, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI.

Another innovative aspect of the subject matter described in this disclosure can be implemented in a non-transitory computer-readable medium storing code for wireless communications at a base station. The code may include instructions executable by a processor to transmit, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE; transmit, to the UE, a unicast downlink data message in the first TTI; and receive, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI.

Another innovative aspect of the subject matter described in this disclosure can be implemented in a method for wireless communications at a UE. The method may include receiving, from a base station, a configuration indicating a schedule of occasions for multicast data messages on a multicast data channel; receiving, from the base station, a configuration indicating a set of uplink control channel resources associated with the multicast data channel; monitoring, according to the indicated schedule, a set of occasions for a set of multicast data messages on the multicast data channel; and transmitting, to the base station, group-negative acknowledgment (NACK) feedback information on one or more uplink control channel resources of the set of uplink control channel resources based on the monitoring the set of occasions.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to receive, from a base station, a configuration indicating a schedule of occasions for multicast data messages on a multicast data channel; receive, from the base station, a configuration indicating a set of uplink control channel resources associated with the multicast data channel; monitor, according to the indicated schedule, a set of occasions for a set of multicast data messages on the multicast data channel; and transmit, to the base station, group-NACK feedback information on one or more uplink control channel resources of the set of uplink control channel resources based on the monitoring the set of occasions.

Another innovative aspect of the subject matter described in this disclosure can be implemented in an apparatus for wireless communications at a UE. The apparatus may include means for receiving, from a base station, a configuration indicating a schedule of occasions for multicast data messages on a multicast data channel; means for receiving, from the base station, a configuration indicating a set of uplink control channel resources associated with the multicast data channel; means for monitoring, according to the indicated schedule, a set of occasions for a set of multicast data messages on the multicast data channel; and means for transmitting, to the base station, group-NACK feedback information on one or more uplink control channel resources of the set of uplink control channel resources based on the monitoring the set of occasions.

Another innovative aspect of the subject matter described in this disclosure can be implemented in a non-transitory computer-readable medium storing code for wireless communications at a UE. The code may include instructions executable by a processor to receive, from a base station, a configuration indicating a schedule of occasions for multicast data messages on a multicast data channel; receive, from the base station, a configuration indicating a set of uplink control channel resources associated with the multicast data channel; monitor, according to the indicated schedule, a set of occasions for a set of multicast data messages on the multicast data channel; and transmit, to the base station, group-NACK feedback information on one or more uplink control channel resources of the set of uplink control channel resources based on the monitoring the set of occasions.

Another innovative aspect of the subject matter described in this disclosure can be implemented in a method for wireless communications at a base station. The method may include transmitting, to a UE, a configuration indicating a schedule of occasions for multicast data messages on a multicast data channel; transmitting, to the UE, a configuration indicating a set of uplink control channel resources associated with the multicast data channel; transmitting, to a set of UEs including the UE, a set of multicast data messages in a set of occasions on the multicast data channel; and receiving, from at least the UE, group-NACK feedback information on one or more uplink control channel resources of the set of uplink control channel resources based on the UE failing to receive at least one multicast data message of the set of multicast data messages.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to transmit, to a UE, a configuration indicating a schedule of occasions for multicast data messages on a multicast data channel; transmit, to the UE, a configuration indicating a set of uplink control channel resources associated with the multicast data channel; transmit, to a set of UEs including the UE, a set of multicast data messages in a set of occasions on the multicast data channel; and receive, from at least the UE, group-NACK feedback information on one or more uplink control channel resources of the set of uplink control channel resources based on the UE failing to receive at least one multicast data message of the set of multicast data messages.

Another innovative aspect of the subject matter described in this disclosure can be implemented in an apparatus for wireless communications at a base station. The apparatus may include means for transmitting, to a UE, a configuration indicating a schedule of occasions for multicast data messages on a multicast data channel; means for transmitting, to the UE, a configuration indicating a set of uplink control channel resources associated with the multicast data channel; means for transmitting, to a set of UEs including the UE, a set of multicast data messages in a set of occasions on the multicast data channel; and means for receiving, from at least the UE, group-NACK feedback information on one or more uplink control channel resources of the set of uplink control channel resources based on the UE failing to receive at least one multicast data message of the set of multicast data messages.

Another innovative aspect of the subject matter described in this disclosure can be implemented in a non-transitory computer-readable medium storing code for wireless communications at a base station. The code may include instructions executable by a processor to transmit, to a UE, a configuration indicating a schedule of occasions for multicast data messages on a multicast data channel; transmit, to the UE, a configuration indicating a set of uplink control channel resources associated with the multicast data channel; transmit, to a set of UEs including the UE, a set of multicast data messages in a set of occasions on the multicast data channel; and receive, from at least the UE, group-NACK feedback information on one or more uplink control channel resources of the set of uplink control channel resources based on the UE failing to receive at least one multicast data message of the set of multicast data messages.

Another innovative aspect of the subject matter described in this disclosure can be implemented in a method for wireless communications at a UE. The method may include determining a configuration of UE-specific control channel resources for the UE to use to transmit acknowledgment feedback; receiving, from a base station, first downlink control information (DCI) scheduling transmission of a unicast data message and second DCI scheduling transmission of a multicast data message; monitoring for the unicast data message according to the received first DCI and the multicast data message according to the received second DCI; and transmitting, to the base station on the UE-specific control channel resources, first acknowledgment information in response to monitoring for the unicast data message and second acknowledgment information in response to monitoring for the multicast data message.

Another innovative aspect of the subject matter described in this disclosure can be implemented in an apparatus for wireless communications at a UE. The apparatus may include a processor, memory coupled with the processor, and instructions stored in the memory. The instructions may be executable by the processor to cause the apparatus to determine a configuration of UE-specific control channel resources for the UE to use to transmit acknowledgment feedback; receive, from a base station, first DCI scheduling transmission of a unicast data message and second DCI scheduling transmission of a multicast data message; monitor for the unicast data message according to the received first DCI and the multicast data message according to the received second DCI; and transmit, to the base station on the UE-specific control channel resources, first acknowledgment information in response to monitoring for the unicast data message and second acknowledgment information in response to monitoring for the multicast data message.

Another innovative aspect of the subject matter described in this disclosure can be implemented in an apparatus for wireless communications at a UE. The apparatus may include means for determining a configuration of UE-specific control channel resources for the UE to use to transmit acknowledgment feedback; means for receiving, from a base station, first DCI scheduling transmission of a unicast data message and second DCI scheduling transmission of a multicast data message; means for monitoring for the unicast data message according to the received first DCI and the multicast data message according to the received second DCI; and means for transmitting, to the base station on the UE-specific control channel resources, first acknowledgment information in response to monitoring for the unicast data message and second acknowledgment information in response to monitoring for the multicast data message.

Another innovative aspect of the subject matter described in this disclosure can be implemented in a non-transitory computer-readable medium storing code for wireless communications at a UE. The code may include instructions executable by a processor to determine a configuration of UE-specific control channel resources for the UE to use to transmit acknowledgment feedback; receive, from a base station, first DCI scheduling transmission of a unicast data message and second DCI scheduling transmission of a multicast data message; monitor for the unicast data message according to the received first DCI and the multicast data message according to the received second DCI; and transmit, to the base station on the UE-specific control channel resources, first acknowledgment information in response to monitoring for the unicast data message and second acknowledgment information in response to monitoring for the multicast data message.

Another innovative aspect of the subject matter described in this disclosure can be implemented in a method for wireless communications at a base station. The method may include transmitting, to a UE, a configuration of UE-specific control channel resources for the UE to use to transmit acknowledgment feedback; transmitting, to the UE, first DCI scheduling transmission of a unicast data message and second DCI scheduling transmission of a multicast data message; transmitting, to the UE, the unicast data message and the multicast data message; and receiving, from the UE on the UE-specific control channel resources, first acknowledgment information in response to the unicast data message and second acknowledgment information in response to the multicast data message.

Another innovative aspect of the subject matter described in this disclosure can be implemented in an apparatus for wireless communications at a base station. The apparatus may include a processor, memory coupled with the processor, and instructions stored in the memory. The instructions may be executable by the processor to cause the apparatus to transmit, to a UE, a configuration of UE-specific control channel resources for the UE to use to transmit acknowledgment feedback; transmit, to the UE, first DCI scheduling transmission of a unicast data message and second DCI scheduling transmission of a multicast data message; transmit, to the UE, the unicast data message and the multicast data message; and receive, from the UE on the UE-specific control channel resources, first acknowledgment information in response to the unicast data message and second acknowledgment information in response to the multicast data message.

Another innovative aspect of the subject matter described in this disclosure can be implemented in an apparatus for wireless communications at a base station. The apparatus may include means for transmitting, to a UE, a configuration of UE-specific control channel resources for the UE to use to transmit acknowledgment feedback; means for transmitting, to the UE, first DCI scheduling transmission of a unicast data message and second DCI scheduling transmission of a multicast data message; means for transmitting, to the UE, the unicast data message and the multicast data message; and means for receiving, from the UE on the UE-specific control channel resources, first acknowledgment information in response to the unicast data message and second acknowledgment information in response to the multicast data message.

Another innovative aspect of the subject matter described in this disclosure can be implemented in a non-transitory computer-readable medium storing code for wireless communications at a base station. The code may include instructions executable by a processor to transmit, to a UE, a configuration of UE-specific control channel resources for the UE to use to transmit acknowledgment feedback; transmit, to the UE, first DCI scheduling transmission of a unicast data message and second DCI scheduling transmission of a multicast data message; transmit, to the UE, the unicast data message and the multicast data message; and receive, from the UE on the UE-specific control channel resources, first acknowledgment information in response to the unicast data message and second acknowledgment information in response to the multicast data message.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
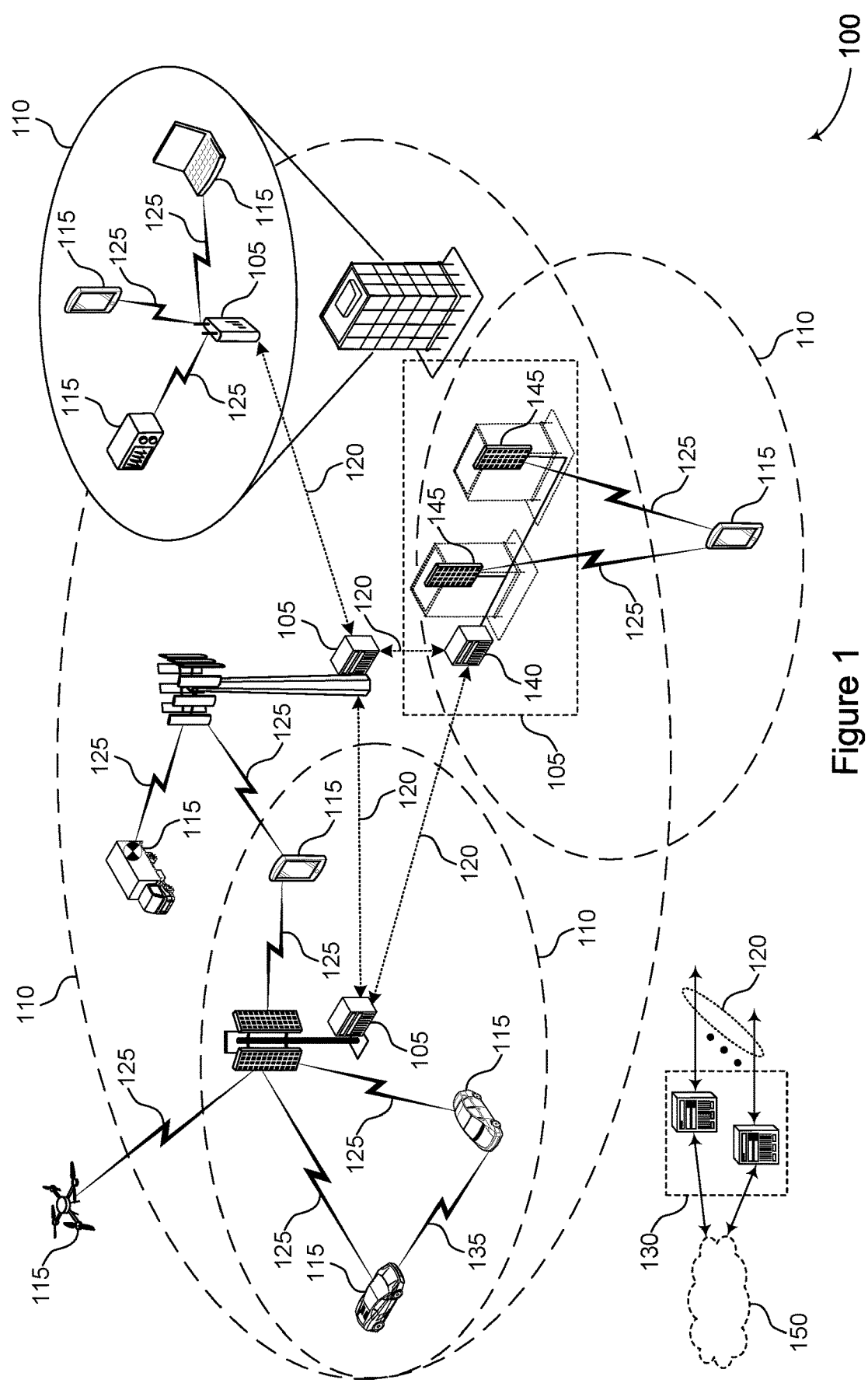
FIGS. 1 and 2 illustrate examples of wireless communications systems that support feedback for multicast and broadcast messages in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations relate generally to mechanisms supporting feedback for multicast and broadcast messages. Some implementations more specifically relate to the configuration of multicast feedback at a user equipment (UE). For example, a base station may configure the UE to enable positive acknowledgment (ACK)/negative acknowledgment (NACK) feedback for multicast transmissions, such as hybrid automatic repeat request (HARQ) feedback. In some implementations, the base station may enable multicast feedback for one or more particular services (for example, a particular multicast service supported by the base station). In some other implementations, the base station may enable multicast feedback for a particular UE via UE-specific signaling, or for a particular group of UEs via multicast signaling.

In some implementations, a UE may provide group-NACK feedback for multicast messages. For example, if a set of UEs monitors for a multicast message and one or more UEs of the set of UEs fails to receive or decode the multicast message, each of the one or more UEs that failed to receive or decode the multicast message may transmit a group-NACK message in shared uplink control channel resources. In some implementations, each multicast packet may correspond to a different uplink control channel feedback resource. In some other implementations, a UE may select an uplink control channel feedback resource for the feedback transmission based on which multicast messages the UE failed to receive. In yet some other implementations, the UE may transmit feedback for multicast messages if the UE failed to receive at least a threshold number of multicast messages, and otherwise the UE may refrain from transmitting feedback. In some examples, the UEs may not be configured for code block group (CBG)-based feedback for multicast transmissions. In some other examples, the UEs may be configured for CBG-based feedback for multicast transmissions. In some implementations, a UE may select an uplink control channel resource, such as a physical uplink control channel (PUCCH) resource, for the feedback transmission from an uplink control channel resource pool.

In some implementations, a UE may receive both multicast messages and unicast messages. If configured for multicast feedback (for example, in addition to unicast feedback), the UE may determine feedback information for both the multicast and unicast messages. In some examples, the UE may transmit ACK/NACK feedback for unicast messages in a first PUCCH resource and may transmit group-NACK feedback for multicast messages in a second PUCCH resource. In some other examples (for example, if the UE is configured with a UE-specific uplink control channel resource for feedback signaling for multicast), the UE may transmit ACK/NACK feedback for unicast messages and ACK/NACK feedback for multicast messages, for example, in separate or joint feedback transmissions. In some implementations, if the UE does not support parallel monitoring for multicast and unicast transmissions, the UE may modify a semi-static HARQ acknowledgment (HARQ-Ack) codebook size for a unicast HARQ-Ack codebook, a multicast HARQ-Ack codebook, or both. For example, if the UE prioritizes multicast reception, the UE may remove candidate unicast physical downlink shared channel (PDSCH) occasions from the semi-static unicast HARQ-Ack codebook that at least partially overlap with multicast slots. Conversely, if the UE prioritizes unicast reception, the UE may remove candidate multicast PDSCH occasions from the semi-static multicast HARQ-Ack codebook that at least partially overlap with unicast slots.

Particular implementations of the subject matter described in this disclosure can be implemented to realize one or more of the following potential advantages. In some implementations, the described techniques can be used to reduce the latency of multicast retransmissions. For example, by enabling feedback for multicast messages at UEs, a UE may indicate to a base station if the UE fails to successfully receive or detect a multicast message. Based on this indication, the base station may proactively retransmit the multicast message. Additionally, if multiple UEs fail to receive a multicast message, the base station may modify a coding rate for a retransmission of the multicast message for improved reception reliability. Implementing group-NACK feedback for multicast transmissions may efficiently utilize uplink control channel resources, as multiple UEs may transmit feedback for a multicast packet in a shared uplink control channel resource (for example, as a group-NACK message). Additionally or alternatively, by supporting base station configuration of multicast feedback, a wireless communications system may support a number of UEs with varying capabilities (for example, including UEs that support transmitting feedback for multicast messages and UEs that do not support transmitting feedback for multicast messages).

FIG. 1 illustrates an example of a wireless communications system 100 that supports feedback for multicast and broadcast messages in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated with reference to FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown with reference to FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (in other words, directly between base stations 105), or indirectly (in other words, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology. The "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown with reference to FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology, such as LTE, LTE-A, LTE-A Pro, or NR. Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications, such as in an FDD mode, or may be configured to carry downlink and uplink communications, such as in a TDD mode.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band or a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier. The symbol period and subcarrier spacing may be inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds. $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region, such as a control resource set (CORESET), for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions, such as mission critical functions. Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device, such as a base station 105.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the medium access control (MAC) layer in poor radio conditions (for example, low signal-to-noise conditions). In some examples, a device may support same-slot HARQ feedback. For same-slot HARQ feedback, the device may provide HARQ feedback in a specific slot for data received in a previous symbol in the slot. In other examples, the device may provide HARQ feedback in a subsequent slot, or according to some other time interval.

A base station 105 in the wireless communications system 100 may communicate with one or more UEs 115 using multicast transmissions. A multicast transmission by a base station 105 may be a single transmission (for example, a single message or packet) to a group of multiple UEs 115, for example in a multicast communication channel. The one or more UEs 115 may receive the multicast messaging by monitoring particular channels for multicast messages.

A broadcast transmission may by a base station 105 may be a single transmission to multiple UEs 115 without being addressed or otherwise directed to a particular group of UEs 115. The broadcast transmissions may be sent on a multicast communication channel in some cases, together with, or instead of, multicast transmissions. In some examples, the techniques described herein for multicast transmissions may be applied to broadcast transmissions, for example broadcast transmissions sent on a multicast channel.

In some radio access technologies (RATs), such as LTE, NR, or other RATs, multicast communications may be supported by multimedia broadcast single frequency network (MBSFN) or single-cell point to multipoint (SC-PTM) communications. For example, one or more base stations 105 may send a multimedia broadcast/multicast service (MBMS) packet in an MBSFN subframe over an MBSFN synchronization area, which may correspond to multiple cells. In some examples, using an SC-PTM configuration, a base station 105 may have flexibility to schedule multicast transmissions to multiple UEs 115 in a PDSCH subframe within a single cell.

In some implementations, ACK/NACK feedback may be configured for transmission by UEs 115 in response to multicast communications. Such configurations may support delay-sensitive and high reliability multicast messaging. For example, if a UE 115 fails to receive a delay-sensitive or high-reliability multicast message from a base station 105, the UE 115 may transmit a feedback message to the base station 105 in response to the failed receipt of the multicast message. The base station 105 may retransmit the message (for example, either as a multicast message or as a unicast message to the UE 115) to support one or more latency thresholds, reliability thresholds, or both associated with the message. Additionally or alternatively, ACK/NACK feedback for multicast communications may support relaxed initial block error rate (BLER) targets for multicast messaging, increasing resource usage capacity in the wireless communications system 100.

In order to efficiently allocate and organize ACK/NACK feedback responses for multiple UEs 115 receiving multicast transmissions, a number of possible configurations may be supported. In some implementations, a configuration may include UE-specific ACK/NACK feedback resources for feedback messaging in response to multicast transmissions. In some other implementations, a configuration may support group-NACK feedback by UEs 115 failing to receive a same multicast message from a base station 105.

Figure 2:
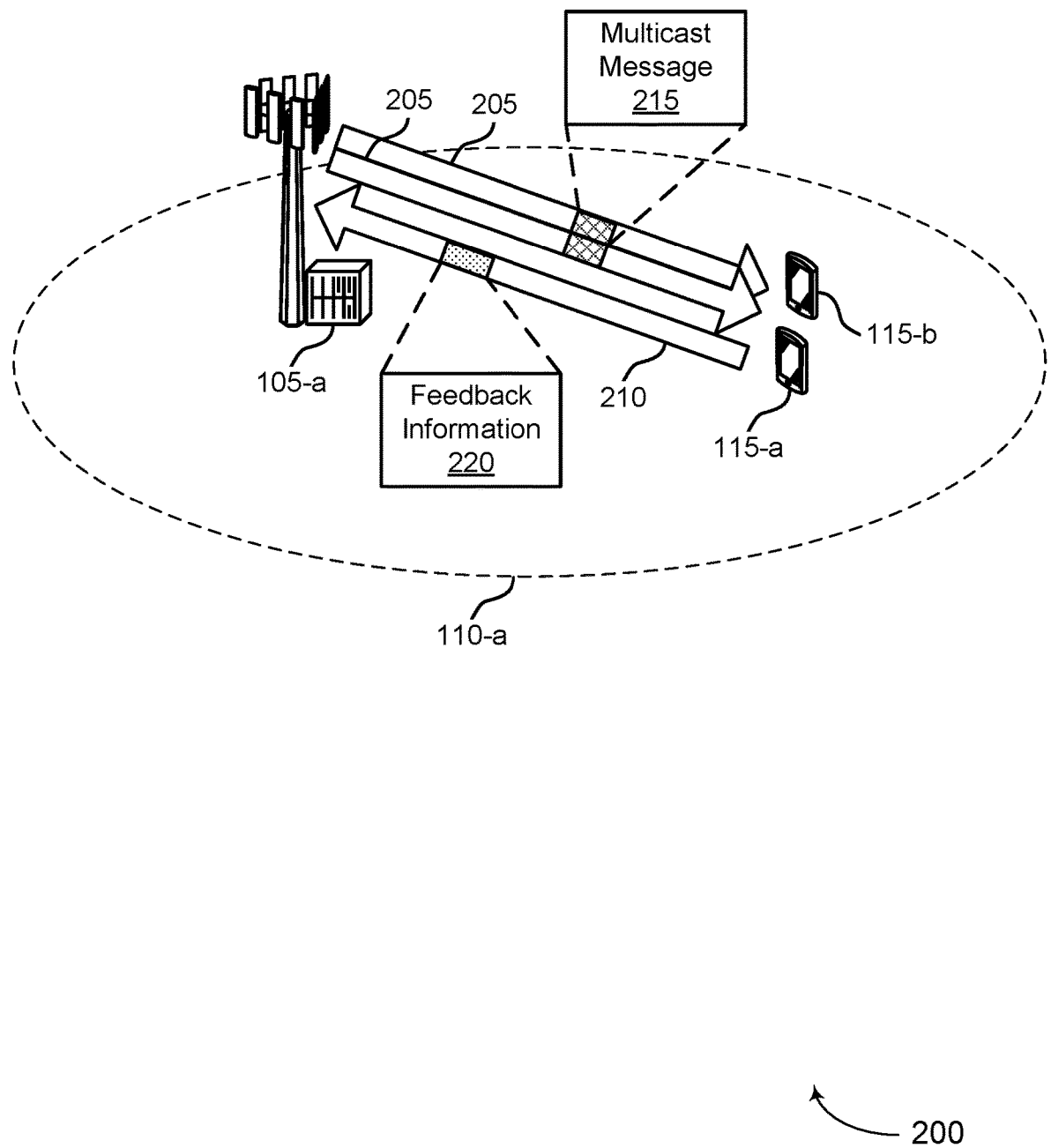

FIG. 2 illustrates an example of a wireless communications system 200 that supports feedback for multicast and broadcast messages in accordance with aspects of the present disclosure. Wireless communications system 200 may include UEs 115-a and 115-b, which may be examples of UEs 115 as described with reference to FIG. 1. Wireless communications system 200 may also include a base station 105-a, which may be an example of a base station 105 as described with reference to FIG. 1. The base station 105-a may transmit a multicast message 215 to UEs 115-a and 115-b in a multicast channel 205. In some implementations, the base station 105-a may additionally transmit unicast communications in unicast communications channels to the UEs 115. In response to the multicast message 215, one or more UEs 115 may transmit feedback information 220 on an uplink channel 210 (for example, a PUCCH). The feedback information 220 may include unicast feedback information 220, multicast feedback information 220, or both. For example, the feedback information 220 may include ACK/NACK feedback information 220, such as unicast ACK/NACK feedback information 220, multicast ACK/NACK feedback information 220, or both, or NACK feedback information 220, such as group-NACK feedback information 220. The transmission of the feedback information 220 may be based on a feedback configuration that may be indicated to the UEs 115 by the base station 105-a.

The base station 105-a may configure one or more UEs 115 with a multicast feedback configuration. The base station 105-a may transmit to one or more UEs 115 an indication of the multicast feedback configuration, which may enable multicast feedback (for example, HARQ feedback, such as ACK/NACK feedback, group-NACK feedback, or any other form of feedback information 220) by one or more UEs 115. The multicast feedback configuration may include an indication of how and when or if one or more UEs 115 may transmit feedback information 220. For example, the configuration may indicate for a UE 115 to transmit group-NACK feedback, UE-specific ACK/NACK feedback, or some combination thereof.

For example, in some implementations, the base station 105-a may enable the multicast feedback for a given service (for example, corresponding to a specific group radio network temporary identifier (G-RNTI)). The service may correspond to a particular multicast control channel (MCCH). Such a configuration may be an example of service-specific ACK/NACK enabling. As used herein, "ACK/NACK" feedback may refer to HARQ feedback, group-NACK feedback, or any other type of feedback indicating whether a message is successfully received by a UE 115. In such implementations, the base station 105-a may indicate this ACK/NACK feedback configuration to a UE 115-a and a UE 115-b. The base station 105-a may determine to enable multicast ACK/NACK feedback for a service if the service corresponds to lower latency requirements (for example, a messaging latency below a defined latency threshold).

The enabling of ACK/NACK multicast feedback may be configured through the transmission of downlink control information (DCI) by the base station 105-a. The DCI may be transmitted to UE 115-a and UE 115-b in unicast or multicast messaging. The DCI may include a number of fields related to feedback information or timing, such as a PDSCH-to-HARQ feedback timing indicator (k1) field, a downlink assignment index (DAI) field, and a PUCCH resource indicator (PRI) field, among other fields. The k1 field may indicate a length of slot delay between reception of a data message from the base station 105-a and the transmission of the ACK/NACK feedback for the data message by the UE 115. The DAI field in the DCI may indicate indexing for different messages, allowing a UE 115 to identify missed DCI (for example, based on missing sequential DAI values). The PRI field in the DCI may include information for the allocation of PUCCH resources for feedback. In some examples, these fields in the DCI may indicate feedback parameters for the UEs 115. In some other examples, the base station 105-a may repurpose these fields in the DCI for particular G-RNTIs (or particular service) for other functionalities, for example, if feedback is not enabled for a particular service (or if this information is configured in some other way for multicast feedback). If the base station 105-a does not enable multicast feedback for a service, the base station 105-a may utilize an upper layer retransmission scheme (for example, a radio resource control (RRC) retransmission scheme) instead of an ACK/NACK-based retransmission scheme.

In some implementations, the base station 105-a may send the ACK/NACK configurations to the UEs 115 via UE-specific signaling, such as via a unicast channel, rather than via a multicast channel 205. The UE-specific signaling may be an example of UE-specific ACK/NACK enabling. In UE-specific ACK/NACK enablement, a set of UEs 115 may be enabled for multicast feedback, while another set of UEs 115 may not be enabled for multicast feedback (for example, for a same multicast message). In some such implementations, the base station 105-a may determine to disable multicast ACK/NACK feedback for particular UEs 115 if the UEs 115 have relatively good geometries (for example, if the UEs 115 correspond to relatively good multicast channel conditions). For example, the base station 105-a may disable multicast ACK/NACK feedback for a UE 115-b based on a measurement report transmitted by the UE 115-b or based on a unicast channel state information (CSI) report transmitted by the UE 115-b.

In some other implementations, the base station 105-a may transmit an ACK/NACK configuration to the UEs 115 in multicast signaling, for example, on the MCCH. The MCCH may be an example of a multicast channel 205. The base station 105-a may further indicate criteria for the UEs 115 to send ACK/NACK feedback for multicast messages. In some examples, such an MCCH configuration may be an example of service-based selective ACK/NACK enabling. For example, the base station 105-a may indicate a threshold channel quality or other parameter in the configuration, and the UEs 115 may determine whether to transmit feedback information 220 based on the parameter. For example, base station 105-a may indicate a multicast reference signal received power (RSRP) threshold to the UEs 115. UEs 115 corresponding to a signal strength above the threshold may not send feedback, and UEs 115 corresponding to a signal strength below or equal to the threshold may send feedback for multicast signaling.

In some examples, the base station 105-a may configure different signal quality thresholds for different antenna configurations. For example, UEs 115 corresponding to a particular antenna configuration may be configured to use different channel quality thresholds to determine whether to transmit multicast feedback. Additionally or alternatively, UEs 115 measuring signal qualities below particular channel quality thresholds may implement different antenna configurations for multicast feedback. Additionally or alternatively, the base station 105-a may provide a probability indication for the UEs 115 to send multicast feedback information 220. Thus, UEs 115-a and 115-b may determine whether to transmit ACK/NACK feedback based on a probability. For example, the probability may be based on how many UEs 115 may use the same feedback resources concurrently, and UE 115-a and UE 115-b may determine whether to transmit feedback information 220 for a multicast message 215 based on the probability.

In some implementations, a UE 115-a may receive both multicast signaling and unicast signaling from a base station 105-a. The UE 115-a may be configured to transmit feedback information 220 for the unicast signaling in the presence of multicast communications (such as multicast message 215) in a multicast channel 205. For example, the UE 115-a may support feedback for unicast signaling but not multicast signaling, or the UE 115-a may support feedback for both unicast signaling and multicast signaling.

In such implementations, the UE 115-*a* may modify a unicast codebook used for the unicast feedback to accommodate for multicast communications. For example, the UE 115-*a* may remove multicast traffic channel (MTCH) TTIs from the unicast semi-static HARQ-Ack codebook generation procedure or may otherwise select or create a unicast semi-static HARQ-Ack codebook excluding TTIs allocated for MTCH. The semi-static codebook size for unicast feedback may depend on a number of parameters. For example, the codebook size may depend on whether the UE 115-*a* is able to support parallel monitoring and reception of transmissions from the base station 105-*a* in both a unicast channel and a multicast channel 205. If the UE 115-*a* cannot support parallel monitoring of unicast and multicast signaling, the UE 115-*a* may determine whether the multicast transmissions in a multicast channel 205 or the unicast transmissions in a unicast channel have higher priority. In some examples, the UE 115-*a* may determine the priority values and transmit an MBMS interest signal (for example, MBMSInterestIndication) to the base station 105-*a* indicating whether the UE 115-*a* prioritizes unicast or multicast reception. Additionally or alternatively, the UE 115-*a* may transmit an indication of the UE's capability to support parallel (for example, concurrent) monitoring of unicast and multicast reception occasions to the base station 105-*a*. The base station 105-*a* may obtain the MBMS interest of the UE 115-*a* based on the MBMS interest signal, the parallel monitoring capability of the UE 115-*a* based on the UE capability signaling, or both, and the base station 105-*a* may determine the unicast semi-static HARQ-Ack codebook size for the UE 115-*a* based on this information.

For example, if the UE 115-*a* does not support parallel monitoring of unicast channels and multicast channels 205 and prioritizes multicast communications (for example, a priority value corresponding to multicast reception is greater than a priority value corresponding to unicast reception), the UE 115-*a* may remove the multicast slots from the unicast semi-static HARQ-Ack codebook for the unicast feedback information 220. The UE 115-*a* may refrain from including unicast PDSCH reception occasions in the unicast semi-static HARQ-Ack codebook that at least partially overlap (for example, in time domain resources) with a multicast TTI or a multicast reception occasion. By removing ACK/NACK bits for these unicast PDSCH reception occasions, the UE 115-*a* may reduce the payload size of the unicast feedback information 220 based on the reduced size of the unicast semi-static HARQ-Ack codebook.

In some implementations, the base station 105-*a* may configure a multicast feedback configuration for transmitting group feedback using a group-NACK message. Group-NACK feedback may support multiple UEs 115 that failed to receive or decode a multicast message transmitting NACK messages on a same uplink control channel resource (in other words, a group of UEs 115 may transmit overlapping NACK information). The base station 105-*a* may receive group-NACK feedback information 220, including one or more group-NACK messages containing group-NACK feedback information 220 for one or more UEs 115, on the uplink control channel resource. In some implementations, a UE 115 (such as UE 115-*a*) may receive a multicast message 215, and the UE 115-*a* may determine that the multicast message 215 is successfully decoded at the UE 115-*a*. Accordingly, the UE 115-*a* may determine not to transmit the feedback information 220 based on the group-NACK feedback configuration (for example, as the UE 115-*a* does not have a NACK to transmit for the multicast message 215).

In some implementations, UEs 115 may transmit group feedback of group-NACK messages in response to a multicast message 215. A UE 115-*a* may monitor for a multicast message 215 on an MTCH that may be scheduled by a G-RNTI-based physical downlink control channel (PDCCH). The UE 115-*a* may determine to send NACK feedback if the UE 115-*a* fails to successfully decode the multicast message 215 on the MTCH. Otherwise, the UE 115-*a* may perform discontinuous transmission (DTX) of feedback information 220. Performing DTX may involve the UE 115-*a* powering-down after successfully decoding the MTCH, rather than transmitting an ACK (or a NACK). If the UE 115-*a* receives a PDCCH message associated with a multicast message 215, the NACK feedback resources may be derived based on the PDCCH (for example, similar to feedback resource derivation for unicast). Thus, the UE 115-*a* may provide, to the base station 105-*a*, feedback information 220 for a single multicast message 215 using one or more of the described techniques.

However, in some implementations, the UE 115-*a* may be scheduled to receive multiple multicast messages 215 and provide feedback for any missed multicast messages 215. The UE 115-*a* may successfully decode some multicast messages 215 but may fail to decode other multicast messages 215, and as a result, the UE 115-*a* may send different feedback information 220 depending on the decoding status of each multicast message 215 (for example, based on the multicast feedback configuration for the UE 115-*a*).

In some implementations, each multicast message 215 may include separate PUCCH resources (for example, time resources, frequency resources, code resources, or a combination thereof) allocated for transmission of corresponding feedback information 220. For example, if the UE 115-*a* fails to decode a first multicast message 215, the UE 115-*a* may transmit a first group-NACK message on a first PUCCH resource, but if the UE 115-*a* fails to decode a second multicast message 215, the UE 115-*a* may transmit a second group-NACK message on a second PUCCH resource different than the first PUCCH resource. In some implementations, the UE 115-*a* may be configured to transmit multiple group-NACK messages at the same time (for example, in PUCCH resources at least partially overlapping in the time domain). For example, the UE 115-*a* may support the transmission of concurrent feedback information 220 for multiple multicast messages 215 using frequency division multiplexing (FDM), code division multiplexing (CDM), or spatial division multiplexing (SDM) techniques. In some implementations, the UE 115-*a* may not support concurrent feedback information 220 transmissions (in other words, the UE 115-*a* may not concurrently support multiple PUCCH channels). In some such implementations, the base station 105-*a* may configure the UE 115-*a* with time-division-multiplexed (TDMed) PUCCH resources for different multicast messages 215 in order to support the UE 115-*a* transmitting feedback information 220 for multiple multicast messages 215.

In some other implementations, the base station 105-*a* may configure the UE 115-*a* with multiple PUCCH resources for transmission of the feedback information 220. The resources may be provided to the UE 115-*a* by the base station 105-*a* in DCI, multicast configuration information, or other signaling. The UE 115-*a* may select different PUCCH resources for group-NACK feedback depending on which of the multicast messages 215 the UE 115-*a* fails to decode. For example, the UE 115-*a* may monitor for two multicast messages 215 and may be provided with three available PUCCH resources for the transmission of feedback information 220 for the two multicast messages 215. If the UE 115-*a* fails to receive the first multicast message 215, the UE 115-*a* may determine to transmit a group-NACK message for the first multicast message 215 in a first PUCCH resource. If the UE 115-*a* fails to receive the second multicast message 215, the UE 115-*a* may determine to transmit a group-NACK message for the second multicast message 215 in a second PUCCH resource. If the UE 115-*a* fails to receive both the first and second multicast messages 215, the UE 115-*a* may determine to transmit a group-NACK message corresponding to both multicast messages 215 in a third PUCCH resource.

In yet some other implementations, a UE 115-*a* may determine whether to transmit a group-NACK message based on a number of failed multicast message receptions. For example, the UE 115-*a* may transmit feedback information 220 if the number of failed multicast messages 215 exceeds a configured threshold. The threshold may be a threshold of N failed multicast messages 215, or the threshold may be a ratio of K failed messages out of M total scheduled multicast messages 215 within a feedback window. If the UE 115-*a* determines to transmit group-NACK feedback information 220 based on a threshold, the base station 105-*a* may receive the group-NACK feedback information 220 and may determine that the UE 115-*a* failed to receive at least N multicast messages 215 (or K out of M multicast messages 215). The base station 105-*a* may not be aware of which particular multicast messages 215 failed based on the NACK feedback information 220 from the UE 115-*a*.

In some implementations, the multicast message 215 transmission by the base station 105-*a* may include outer coding on the multicast message 215. The base station 105-*a* can transmit repair packets for multicast messages 215 with outer coding based on the feedback information 220 from the UE 115-*a*, and the base station 105-*a* may therefore provide information to help the UE 115-*a* successfully decode a failed multicast message 215 without requiring the base station 105-*a* to determine the particular multicast message 215 that failed. In some implementations, the base station 105-*a* may use the received feedback information 220 for rate adaptation with multicast scheduling. For example, if multiple UEs 115 fail to decode a threshold number of multicast messages 215, the base station 105-*a* may reduce a coding rate to achieve an improved multicast transmission reliability. In other implementations, the base station 105-*a* may use the feedback for contention window updates for unlicensed operations.

In order to improve granularity, the base station 105-*a* may allocate multiple PUCCH resources for transmission of group-NACK feedback information 220 by the UE 115-*a*. In some examples, each PUCCH resource may correspond to different thresholds of failed multicast messages 215 (for example, the number of failed multicast message receptions or a ratio of failed receptions to total attempted receptions). For example, a first PUCCH resource may correspond to the UE 115-*a* failing to decode one multicast message 215, and a second PUCCH resource may correspond to the UE 115-*a* failing to decode two multicast messages 215 (for example, regardless of which particular messages failed).

In some implementations, code block group (CBG)-based feedback information 220 for multicast messages 215 may be configured for use by a UE 115-*a*. In implementations in which CBG-based feedback is configured, the UE 115-*a* may treat each CBG as an individual packet (for example, an individual multicast message 215). In such implementations, the multicast feedback configuration for each CBG may depend on the multicast feedback configuration for the UE 115-*a*. In other implementations, base station 105-*a* may not configure CBG-based feedback for multicast configurations. Additionally or alternatively, if multi-carrier communication is configured for multicast and the UE 115-*a* is configured to provide feedback for multicast messages 215, the UE 115-*a* may provide the multicast feedback information 220 on each carrier configured for multicast feedback.

In some implementations, the UEs 115 may determine the PUCCH resource configuration for group-NACK feedback information 220 based on a PUCCH resource pool. For example, a set of UEs 115, such as UE 115-*a* and UE 115-*b*, may have the same PUCCH resource pool available for feedback in response to multicast messages 215. In some examples, the base station 105-*a* may transmit DCI to the one or more UEs 115. The DCI may indicate, in the PRI field, which PUCCH resource of the PUCCH resource pool may be used for NACK feedback. In some such examples, there may be a UE-specific configuration for UEs 115 in connected mode (for example, in an RRC connected mode).

In some other implementations, the base station 105-*a* may configure a service-specific PUCCH resource pool for ACK/NACK feedback responses to multicast messages 215. The base station 105-*a* may transmit DCI which may indicate, in the PRI field, one or more PUCCH resources of the service-specific PUCCH resource pool that may be used for NACK feedback. If multiple possible PUCCH resources are indicated (for example, a subset of PUCCH resources of the PUCCH resource pool), different UEs 115 (for example, UE 115-*a* and UE 115-*b*) may randomly or pseudo-randomly select a PUCCH resource from among the multiple indicated PUCCH resources for transmission of NACK feedback information 220.

In some implementations, a UE 115 (for example, the UE 115-*a*) may receive both unicast messages on a unicast channel and multicast messages 215 on a multicast channel 205 from the base station 105-*a*. As such, the UE 115-*a* may be configured to transmit feedback information 220 for both a scheduled unicast message and a scheduled multicast message 215. In some such implementations, the UE 115-*a* may use a feedback message configuration, such as an ACK/NACK codebook, and feedback resources for unicast message feedback that may be separate from—or otherwise different than—a feedback message configuration, such as a group-NACK message, feedback resources, or both used to transmit multicast message feedback. For example, the UE 115-*a* may use a HARQ-Ack codebook for unicast feedback and a group-NACK message for multicast feedback. Furthermore, in some examples, the UE 115-*a* may support concurrent PUCCH feedback for unicast and multicast messages. In some other examples, the UE 115-*a* may use TDMed PUCCH resources for unicast and multicast feedback transmissions. Additionally or alternatively, the UE 115-*a* may be scheduled for physical uplink shared channel (PUSCH) transmission in resources at least partially overlapping in the time domain with PUCCH resource for group-NACK feedback. If the UE 115-*a* is configured to operate in a carrier aggregation (CA) mode, and the UE 115-*a* also supports multiple PUCCH groups, the base station 105-*a* may configure one PUCCH group for unicast ACK/NACK feedback information 220 and another PUCCH group for multicast group-NACK feedback information 220. In some examples, the UE 115-*a* may further utilize separate timing advance (TA) and power control loops for multicast group-NACK feedback and unicast HARQ feedback transmitted in PUCCH resources.

In some implementations, one or more UEs 115 may be configured to transmit ACK/NACK feedback information 220 separately on a per-UE basis in response to multicast messages 215. In such implementations, a UE 115-a may utilize one or more unicast mechanisms for transmitting multicast ACK/NACK feedback information 220. For example, the base station 105-a may individually configure the PUCCH resources used to transmit multicast ACK/NACK feedback information 220 for each UE 115. In some examples, UEs 115 may have the same PUCCH resource pool to select PUCCH resources for transmission of ACK/NACK feedback in response to both unicast messages received in a unicast channel and multicast messages received in a multicast channel 205. For semi-static feedback configurations, and if a UE 115 is unable to concurrently monitor for unicast transmissions in a unicast channel and multicast messages 215 in a multicast channel 205, the semi-static codebooks for ACK/NACK feedback information 220 may be modified based on candidate unicast PDSCH occasions, candidate multicast PDSCH occasions, or both. For example, if the UE 115-a prioritizes multicast communications, the UE 115-a may remove candidate unicast PDSCH occasions from the unicast semi-static HARQ-Ack codebook that are in multicast slots, while the multicast semi-static HARQ-Ack codebook may include the multicast PDSCH occasions in the multicast slots. Alternatively, if the UE 115-a prioritizes unicast communications, the UE 115-a may remove candidate multicast PDSCH occasions from the multicast semi-static HARQ-Ack codebook that are in unicast slots, while the unicast semi-static HARQ-Ack codebook may include the unicast PDSCH occasions in the unicast slots. This may apply to implementations in which the UE 115-a uses separate codebooks for unicast and multicast feedback.

In some implementations, the UE 115-a may transmit unicast ACK/NACK feedback information 220 and UE-specific multicast ACK/NACK feedback information 220. In such implementations, the UE 115-a may send individual multicast ACK/NACK feedback information 220 in a UE-specific PUCCH resource rather than transmitting group-based ACK/NACK feedback information 220 using a group-NACK feedback resource. In some implementations, the wireless communications system 200 may use separate counter DAI (cDAI) values for unicast and multicast and separate total DAI (tDAI) values for unicast and multicast. For example, the base station 105-a may use unicast-specific cDAI and tDAI in DCI scheduling unicast feedback and multicast-specific cDAI and tDAI in DCI scheduling multicast feedback.

In some implementations, the UE 115-a may use separate PUCCH resources to transmit unicast ACK/NACK feedback information 220 and multicast ACK/NACK feedback information 220. For example, the UE 115-a may transmit a unicast HARQ message in a first PUCCH resource and a multicast HARQ message in a second PUCCH resource different than the first PUCCH resource (for example, FDMed, TDMed, SDMed, CDMed, or some combination thereof with the first PUCCH resource). In some other implementations, the UE 115-a may utilize joint PUCCH feedback resources for transmission of multicast ACK/NACK feedback information 220 and unicast ACK/NACK feedback information 220. The UE 115-a may generate a unicast codebook and a multicast codebook and may aggregate the codebooks together to create a joint feedback message for both unicast and multicast feedback. The UE 115-a may transmit the joint feedback message on a joint PUCCH resource for both unicast and multicast feedback.

In some implementations, the base station 105-a may transmit uplink DCI to the UE 115-a including an uplink grant. The uplink grant may include a tDAI value indicating that the UE 115-a is to multiplex HARQ feedback with the granted PUSCH transmission. In some examples, if the UE 115-a implements joint feedback for unicast and multicast, the base station 105-a may set two tDAI fields in the uplink grant. One tDAI may correspond to a unicast tDAI and the other tDAI may correspond to a multicast tDAI. This may improve the robustness of the system if the UE 115-a misses a DCI message, as the UE 115-a may identify whether the missed DCI message is for a unicast message or a multicast message based on the separate unicast and multicast DAIS and may generate HARQ-Ack codebook accordingly (for example, with NACKs in the correct codebook slots). In some other implementations, the base station 105-a may set a single DAI field in the uplink grant corresponding to both unicast and multicast downlink transmissions. In such implementations, if the UE 115-a misses a downlink grant transmitted by the base station 105-a, the payload size of the uplink control information (UCI) may be consistent such that PUSCH detection at the base station 105-a may not be affected (for example, based on the single tDAI for both unicast and multicast). Additionally or alternatively, the UE 115-a may implement CBG-based unicast ACK/NACK feedback information 220, CBG-based multicast ACK/NACK feedback information 220, or both. If implementing CBG-based feedback, the base station 105-a may additionally implement separate DAI fields for transport block (TB)-based feedback and CBG-based feedback. Accordingly, if CBG-based feedback is enabled, the uplink grant may include four tDAI fields corresponding to unicast TB-based tDAI, unicast CBG-based tDAI, multicast TB-based tDAI, and multicast CBG-based tDAI, or the uplink grant may include two tDAI fields corresponding to TB-based tDAI for both unicast and multicast and CBG-based tDAI for both unicast and multicast.

Figure 3:
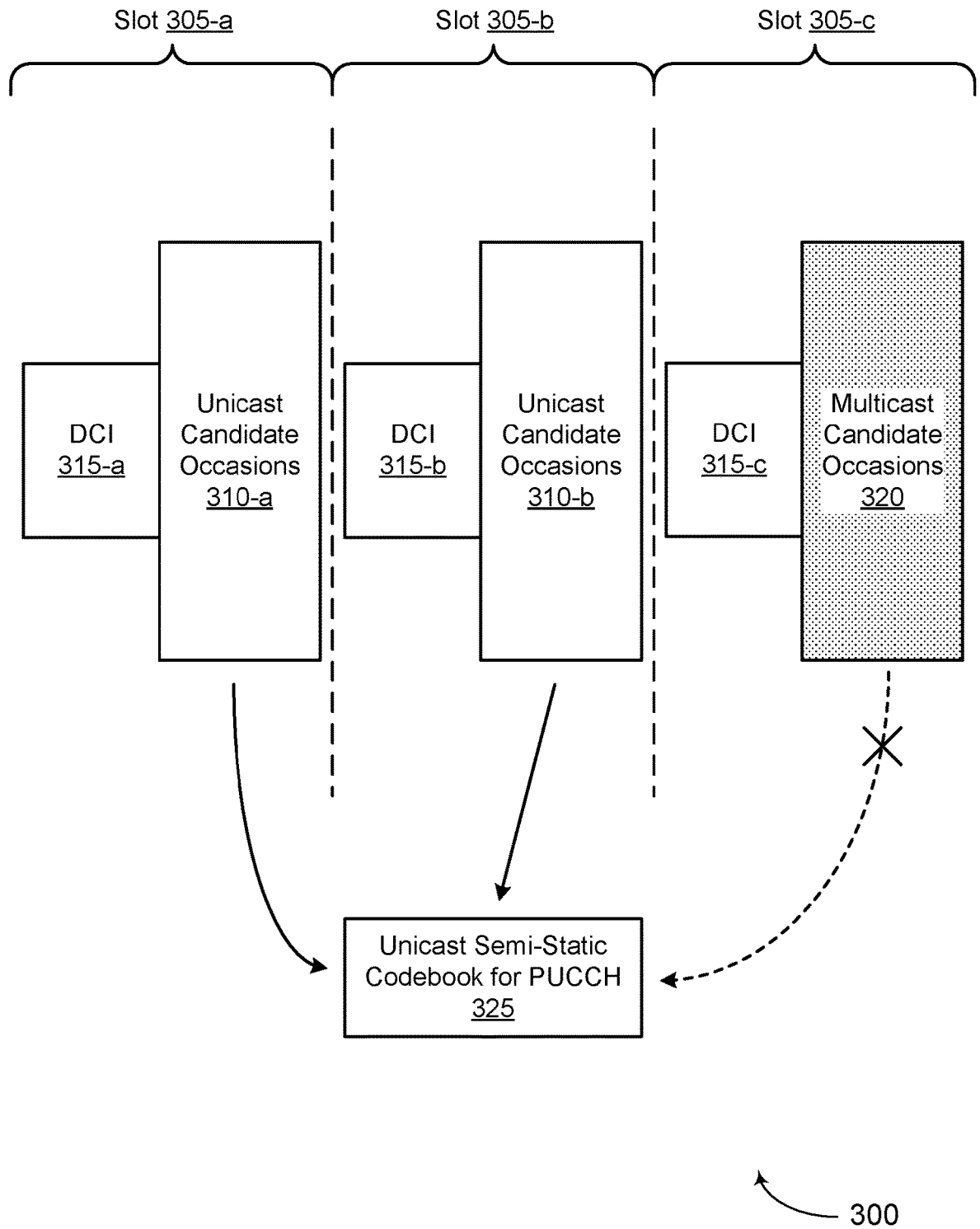
FIG. 3 illustrates an example of a codebook creation procedure that supports feedback for multicast and broadcast messages in accordance with aspects of the present disclosure.

FIG. 3 illustrates an example of a codebook creation procedure 300 that supports feedback for multicast and broadcast messages in accordance with aspects of the present disclosure. A UE 115, such as a UE 115-a as described with reference to FIG. 2, may receive information from a base station 105 (such as a base station 105-a as described with reference to FIG. 2) in accordance with the slots 305. The slots 305 may be used in a codebook creation procedure 300 to generate a unicast semi-static HARQ-Ack codebook for PUCCH 325. The UE 115 may modify the unicast semi-static ACK codebook for PUCCH 325 to remove ACK/NACK information for unicast candidate occasions 310 at least partially overlapping with multicast candidate occasions 320.

A UE 115 may determine a set of candidate occasions of a downlink data channel which may be used for generating uplink ACK/NACK feedback. The candidate occasions may be located within a slot 305 of a set of slots 305 corresponding to a same feedback opportunity. The set of candidate occasions may include at least a first candidate occasion allocated for unicast downlink data for the UE 115 and at least a second candidate occasion allocated for multicast downlink data for the UE 115. The UE 115 may monitor the set of candidate occasions for the unicast downlink data and the multicast downlink data. For example, the UE 115 may receive DCI 315-a in slot 305-a. DCI 315-a may schedule unicast transmissions in unicast candidate occasions 310-a in the slot 305-a and may indicate a PUCCH opportunity for feedback for the unicast candidate occasions 310-a. Furthermore, the UE 115 may receive DCI 315-b scheduling unicast transmissions in unicast candidate occasions 310-*b* in slot 305-*b*. The UE 115 may also receive DCI 315-*c* scheduling multicast transmissions in slot 305-*c* (for example, in multicast candidate occasions 320 that at least partially overlap with one or more unicast candidate occasions 310 in slot 305-*c*).

The UE 115 may determine ACK/NACK information for the monitored set of candidate occasions 310 and 320 according to a HARQ-Ack codebook. If the HARQ-Ack codebook is a semi-static unicast HARQ-Ack codebook, the codebook may include codebook slots for each of the unicast candidate occasions 310-*a* and 310-*b*. For example, if the UE 115 receives a downlink grant for a unicast downlink message in a unicast candidate occasion, the UE 115 may attempt to receive and decode the unicast downlink message. If the UE 115 successfully decodes the unicast downlink message, the UE 115 may input an ACK into the codebook at the codebook slot corresponding to the unicast candidate occasion. If the UE 115 fails to decode the unicast downlink message, the UE 115 may input a NACK into the codebook at the codebook slot corresponding to the unicast candidate occasion. Additionally, if the UE 115 does not receive DCI scheduling a downlink message in a unicast candidate occasion, the UE 115 may input a dummy NACK into the codebook at the codebook slot corresponding to the unicast candidate occasion.

In some implementations, the UE 115 may be configured to transmit unicast ACK/NACK feedback (for example, ACK/NACK feedback information 220 as described with reference to FIG. 2) in the presence of multicast communications received in a multicast channel. The UE 115 may transmit ACK/NACK feedback based on a unicast codebook. In some implementations, the codebook size of the semi-static unicast HARQ-Ack codebook may depend on whether the UE 115 can support parallel monitoring of the unicast channel and the multicast channel. If the UE 115 supports parallel monitoring, the UE 115 may use a full-size semi-static unicast HARQ-Ack codebook (as the UE 115 may monitor the unicast candidate occasions 310 in slot 305-*c* despite the presence of the multicast candidate occasions 320). However, if the UE 115 is not able to support parallel monitoring of the unicast channel and the multicast channel, the UE 115 may determine whether the multicast transmissions in the multicast channel or the unicast transmissions in the unicast channel have higher priority.

If the UE 115 does not support parallel monitoring and prioritizes multicast reception, the UE 115 may create the unicast semi-static codebook for PUCCH 325 by including TTIs allocated for unicast downlink data and excluding TTIs allocated for multicast downlink data. For example, the UE 115 may refrain from using unicast candidate occasions 310 from slot 305-*c* in the codebook generation based on slot 305-*c* being a multicast slot (for example, slot 305-*c* includes multicast candidate occasions 320). For example, the UE 115 may determine to exclude any unicast candidate occasions at least partially overlapping in time with the multicast candidate occasions 320 based on the multicast data having a first priority value that is greater than a second priority value for the unicast downlink data. In some examples, the UE 115 may transmit, to a base station 105, one or more of a multicast interest indication, a unicast interest indication, or a multicast-unicast parallel monitoring UE capability. The UE 115 may determine to exclude the candidate occasions for the multicast slot 305-*c* from the unicast semi-static codebook for PUCCH 325 based on the transmitted information.

By generating a unicast semi-static HARQ-Ack codebook with fewer codebook slots (for example, based on refraining from including the unicast candidate occasions 310 from the multicast slot 305-*c*), the UE 115 may reduce the payload size of the HARQ feedback message. For example, based on the UE's capabilities, the UE 115 may not be able to successfully monitor for unicast candidate occasions 310 in the slot 305-*c*, so the removed codebook slots would simply include NACKs. By indicating the UE's capabilities to the base station 105, the base station 105 may determine that the UE 115 cannot receive unicast downlink data in the unicast candidate occasions 310 of multicast slot 305-*c*, making this NACK feedback redundant. As such, the UE 115 may reduce the payload of the unicast semi-static codebook for PUCCH 325 to efficiently utilize the available PUCCH resources.

Figure 4:
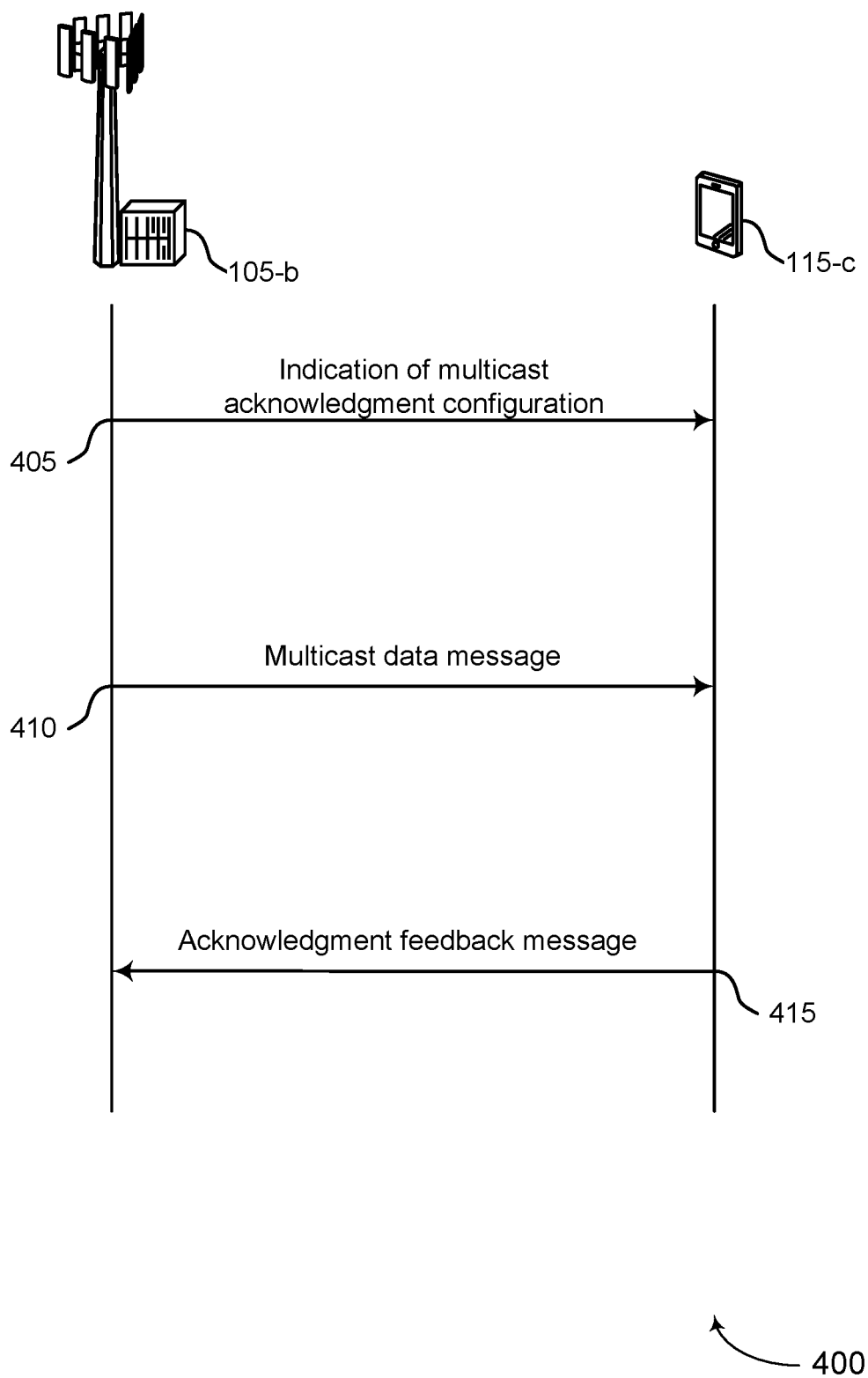
FIGS. 4-6 illustrate examples of process flows that support feedback for multicast and broadcast messages in accordance with aspects of the present disclosure.

FIG. 4 illustrates an example of a process flow 400 that supports feedback for multicast and broadcast messages in accordance with aspects of the present disclosure. Process flow 400 may involve a UE 115-*c*, which may be an example of a UE 115 as described with reference to FIGS. 1 and 2. Process flow 400 may also involve a base station 105-*b*, which may be an example of a base station 105 as described with reference to FIGS. 1 and 2. The base station 105-*b* and the UE 115-*c* may communicate through multicast transmissions transmitted by the base station 105-*b* and ACK/NACK feedback transmitted by the UE 115-*c*.

At 405, the UE 115-*c* may receive, from base station 105-*b*, an indication of a multicast acknowledgment configuration (for example, a multicast ACK/NACK configuration) to enable acknowledgment feedback by the UE 115-*c* for multicast messages. The indication of the multicast configuration may enable ACK/NACK feedback (for example, transmission of an ACK or a NACK by the UE 115-*c*) for multicast messages, based on the multicast ACK/NACK configuration being specific to a service. For example, the base station 105-*b* may enable the ACK/NACK feedback for multicast messages for the service based on a latency threshold for the service. In some implementations, the UE 115-*c* may receive a UE-specific configuration message including the indication of the multicast ACK/NACK configuration. In some other implementations, the base station 105-*c* may configure the UE 115-*c* with the multicast ACK/NACK configuration using multicast signaling.

In some implementations, the UE 115-*c* may transmit one or both of a UE measurement report or a unicast CSI report to the base station 105-*b*. In some such implementations, the base station 105-*b* may determine a UE-specific configuration message based on one or both of the UE measurement report or the unicast CSI report.

In some implementations, the multicast ACK/NACK configuration may include one or more service-based criteria, a multicast RSRP threshold, an antenna configuration-specific threshold, a probability for enabling the ACK/NACK feedback for multicast messages, or a combination thereof, among other examples.

At 410, the UE 115-*c* may receive, from the base station 105-*b*, a multicast data message. In some implementations, receiving the multicast ACK/NACK configuration at 405 may involve receiving, from the base station 105-*b* on an MCCH, a multicast configuration message including the indication of the multicast ACK/NACK configuration. In such implementations, the multicast ACK/NACK configuration may be designated for a set of UEs 115. In some such implementations, the multicast data message 410 may be addressed to the set of UEs 115.

At 415, the UE 115-c may transmit, to the base station 105-b, an acknowledgment feedback message in response to the multicast data message received at 410. The acknowledgment feedback message may be based on the indication of the multicast ACK/NACK configuration received at 405.

Figure 5:
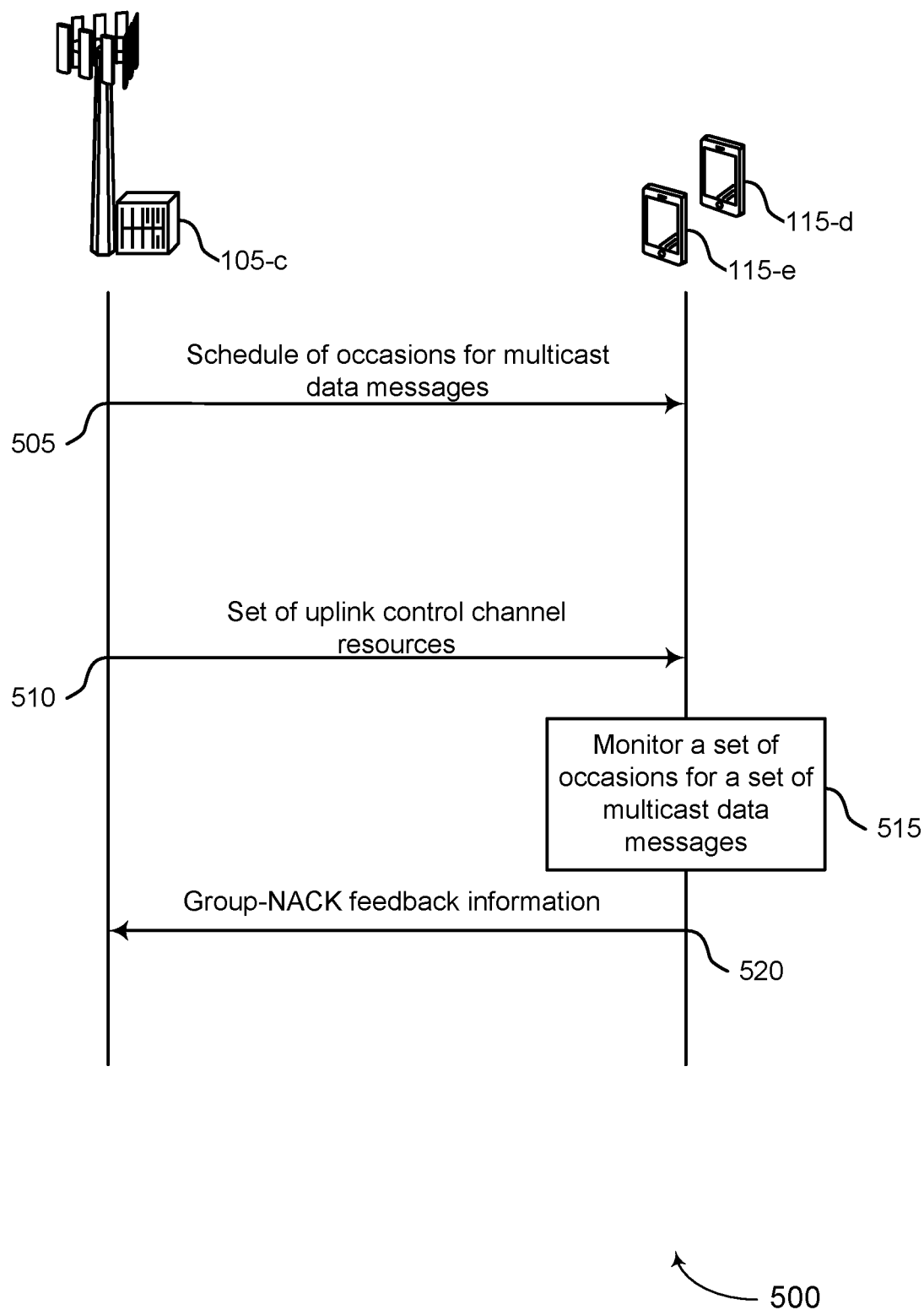

FIG. 5 illustrates an example of a process flow 500 that supports feedback for multicast and broadcast messages in accordance with aspects of the present disclosure. Process flow 500 may involve UEs 115-d and 115-e, which may be examples of UEs 115 as described with reference to FIGS. 1 and 2. Process flow 500 may also involve a base station 105-c, which may be an example of a base station 105 as described with reference to FIGS. 1 and 2. The base station 105-c and the UEs 115-d and 115-e may communicate through multicast transmissions transmitted by the base station 105-c and ACK/NACK feedback transmitted by the UEs 115-d and 115-e.

At 505, one or more UEs 115 (for example, a UE 115-d and a UE 115-e) may receive, from a base station 105-c, a configuration indicating a schedule of occasions for multicast data messages on a multicast data channel.

At 510, one or more UEs 115 (for example, a UE 115-d and a UE 115-e) may receive, from the base station 105-c, a configuration indicating a set of uplink control channel resources, such as PUCCH resources, associated with the multicast data channel. In some implementations, a UE 115-d may receive a configuration of an uplink control channel resource pool. The UE 115-d may select an uplink control channel resource from the uplink control channel resource pool for transmitting multicast feedback. In some such implementations, the configuration of the uplink control channel resource pool is one or both of UE-specific or service-specific.

In some implementations, at 510, the UE 115-d, the UE 115-e, or both, may receive, from the base station 105-c, DCI indicating an uplink control channel resource from the uplink control channel resource pool for transmitting multicast feedback. In some implementations, at 510, the UEs 115 may receive, from the base station 105-c, DCI indicating a subset of uplink control channel resources from the uplink control channel resource pool. A UE 115, such as a UE 115-d, may randomly (or pseudo-randomly) select an uplink control channel resource from the subset of uplink control channel resources for transmitting the multicast feedback. In some examples, the uplink control channel resource pool may support both multicast feedback and unicast feedback.

In some implementations, the configuration indicating the set of uplink control channel resources may be transmitted by the base station 105-c via RRC signaling. In some implementations, the configuration indicating the set of uplink control channel resources may be one or both of service-specific or UE-specific.

At 515, the one or more UEs 115 may monitor, according to the indicated schedule at 505, a set of occasions for a set of multicast data messages on the multicast data channel. The base station 105-c may transmit, to the UEs 115 a set of multicast data messages in the set of occasions on the multicast data channel. At 520, UE 115-d, UE 115-e, or both, may transmit, to the base station 105-c, group-NACK feedback information on one or more uplink control channel resources of the set of uplink control channel resources based on the monitoring of the set of occasions.

For example, based on the monitoring, one or more of the UEs 115-d and 115-e may determine that it has failed to receive at least one multicast data message on the multicast data channel. The UE 115-d or 115-e that failed to receive the at least one multicast data message may select—or otherwise determine—the one or more uplink control channel resources of the set of uplink control channel resources for transmitting group-NACK feedback information based on the at least one multicast data message that the UE 115 failed to receive. In such implementations, the base station 105-c may determine the at least one multicast data message that the UE 115 failed to receive based on the one or more uplink control channel resources on which the base station 105-c receives the group-NACK feedback information.

In some implementations, one or more UEs 115, such as a UE 115-d, may transmit, to the base station 105-c in a first uplink control channel resource of the set of uplink control channel resources, a first group-NACK message in response to a first multicast data message of the set of multicast data messages. The UE 115-d may also transmit, to the base station 105-c in a second uplink control channel resource of the set of uplink control channel resources different than the first uplink control channel resource, a second group-NACK message in response to a second multicast data message of the set of multicast data messages. In some such implementations, the first uplink control channel resource and the second uplink control channel resource are multiplexed using TDM, FDM, CDM, SDM, or a combination of these. In some implementations, the first uplink control channel resource and the second uplink control channel resources are based on the capability of the UE 115-d to concurrently transmit the first group-NACK message and the second group-NACK message.

One or more of the UEs 115 may determine that a number of the set of multicast data messages for which the UE 115 (for example, the UE 115-d) is to transmit the group-NACK feedback information is greater than a threshold number. The group-NACK feedback information may be transmitted based on the determination that the number is greater than the threshold number (for example, the UE 115-d failed to receive a number of multicast packets greater than a threshold number). The UE 115-d may select the one or more uplink control channel resources of the set of uplink control channel resources for transmitting the group-NACK feedback information at 520 based on the number of the set of multicast data messages for which the UE 115 (for example, UE 115-d) is to transmit the group-NACK feedback information. In some implementations, the group-NACK feedback information indicates a number of messages in the set of multicast data messages.

The base station 105-c may determine a threshold number of the set of multicast data messages that the UE 115 (for example, UE 115-d) failed to receive based on receiving the group-NACK feedback information. The base station 105-c may then transmit, to the UE 115-d, based on the threshold number of multicast data messages that the UE 115-d failed to receive, one or more of a repair packet, a rate-adaptation for the schedule transmitted at 505, or an updated contention window.

In some implementations, a UE 115-d may monitor for a unicast downlink message. The UE 115-d may transmit, to the base station 105-c, a HARQ message in response to the unicast downlink message. In some such implementations, the HARQ message and the group-NACK feedback information may be transmitted concurrently at 520. In some implementations, the first uplink control channel resource for transmitting the HARQ message is TDMed with a second uplink control channel resource for transmitting the group-NACK feedback information. In some implementations, the HARQ message may be transmitted using one or both of a first TA value or a first power control value. In such implementations, the group-NACK feedback information may be transmitted at 520 using one or both of a second TA value different than the first TA value or a second power control value different than the first power control value.

In some implementations, the UE 115-*d* may determine a CA configuration, in which a first uplink control channel group is configured for unicast feedback and a second uplink control channel group is configured for multicast feedback.

In some implementations, the group-NACK feedback information may include TB-level group-NACK feedback information for the set of multicast data messages. In some other implementations, the group-NACK feedback information may include CBG-level group-NACK feedback information for the set of multicast data messages. In such implementations, at least one multicast data message of the set of multicast data messages includes a set of CBGs.

In some implementations, the base station 105-*c* may configure the UEs 115 with a set of carriers for multicast communications. In some such implementations, the transmission of the group-NACK feedback information at 520 includes transmitting the group-NACK feedback information on each carrier of a set of carriers configured for multicast communications for the UEs 115.

In some implementations, one or more of UEs 115-*d* and 115-*e* may receive, from the base station 105-*c*, an uplink grant for an uplink data transmission indicating an uplink data channel resource that may be at least partially overlapping in time with an uplink control channel resource for transmitting the group-NACK feedback information. In such implementations, the UE 115 may transmit the uplink data transmission concurrently with the group-NACK feedback information at 520.

Figure 6:
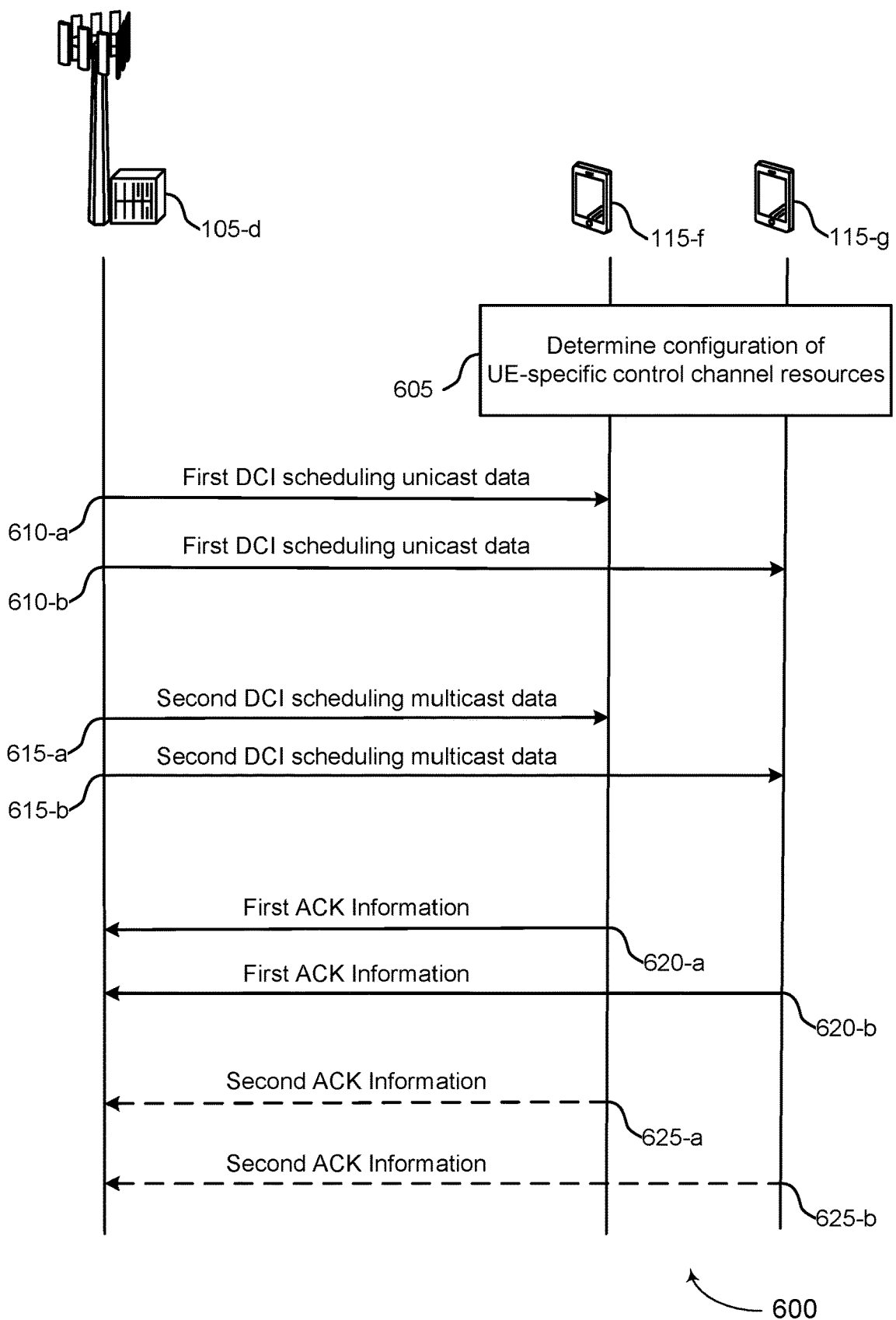

FIG. 6 illustrates an example of a process flow 600 that supports feedback for multicast and broadcast messages in accordance with aspects of the present disclosure. Process flow 600 may involve UEs 115-*f* and 115-*g*, which may be examples of UEs 115 as described with reference to FIGS. 1 and 2. Process flow 600 may also involve a base station 105-*d*, which may be an example of a base station 105 as described with reference to FIGS. 1 and 2. The base station 105-*d* and the UEs 115-*f* and 115-*g* may communicate through multicast transmissions transmitted by the base station 105-*d* and ACK/NACK feedback transmitted by the UEs 115-*f* and 115-*g*.

At 605, one or more UEs 115 (for example, UEs 115-*f* and 115-*g*) may determine a configuration of UE-specific control channel resources for the UEs 115 to use to transmit ACK/NACK feedback.

At 610, one or more UEs 115 may receive, from the base station 105-*d*, first DCI scheduling the transmission of a unicast data message. For example, at 610-*a*, UE 115-*f* may receive first DCI scheduling transmission of a unicast data message, and at 610-*b*, UE 115-*g* may receive first DCI scheduling transmission of a unicast data message.

At 615, one or more UEs 115 may receive, from the base station 105-*d*, second DCI scheduling transmission of a multicast message. For example, at 615-*a*, UE 115-*f* may receive second DCI scheduling transmission of a multicast data message, and at 615-*b*, UE 115-*g* may receive second DCI scheduling transmission of the multicast data message.

UEs 115-*f* and 115-*g* may both monitor for the unicast data messages according to the received first DCI and the multicast message according to the received second DCI. In some implementations, one or more of the UEs 115 may refrain from monitoring for one or more multicast data messages based on an overlap between one or more occasions for unicast data transmission scheduled by the first DCI and one or more occasions for multicast data transmissions scheduled by the second DCI. In such implementations, the one or more UEs 115 may modify a semi-static multicast ACK codebook to remove ACK information for the one or more multicast data messages based on refraining from monitoring for the one or more multicast data messages. The one or more UEs 115 may generate ACK information using the modified semi-static multicast ACK codebook. In some such implementation, refraining from monitoring for the one or more multicast data messages may be based on the one or more UEs 115 not supporting parallel monitoring of the one or more occasions for multicast data transmissions and the one or more occasion for the unicast data transmissions.

At 620, one or more UEs 115 may transmit, to the base station 105-*d*, first ACK information. For example, at 620-*a*, UE 115-*f* may transmit to the base station 105-*d* on UE-specific control channel resources, first ACK information in response to monitoring for the unicast data message. At 620-*b*, UE 115-*g* may transmit to the base station 105-*d* on UE-specific control channel resources, first ACK information in response to monitoring for the unicast data message.

In some implementations, at 625, one or more UEs 115 may transmit, to the base station 105-*d*, second ACK information. For example, at 625-*a*, UE 115-*f* may transmit to the base station 105-*d* on UE-specific control channel resources, second ACK information in response to monitoring for the multicast data message. At 625-*b*, UE 115-*g* may transmit to the base station 105-*d* on UE-specific control channel resources different than the UE-specific control channel resources for UE 1154, second ACK information in response to monitoring for the multicast data message. In some other implementations, the one or more UEs 115 may transmit the second ACK information with the first ACK information in joint transmissions. In some examples, a UE 115, such as UE 115-*f*, may create a unicast-specific sub-codebook based on a unicast-specific cDAI and a unicast-specific tDAI and may create a multicast-specific sub-codebook based on a multicast-specific cDAI and a multicast-specific tDAI. The UE 115-*f* may aggregate these sub-codebooks to generate a joint feedback message for unicast and multicast.

Figure 7:
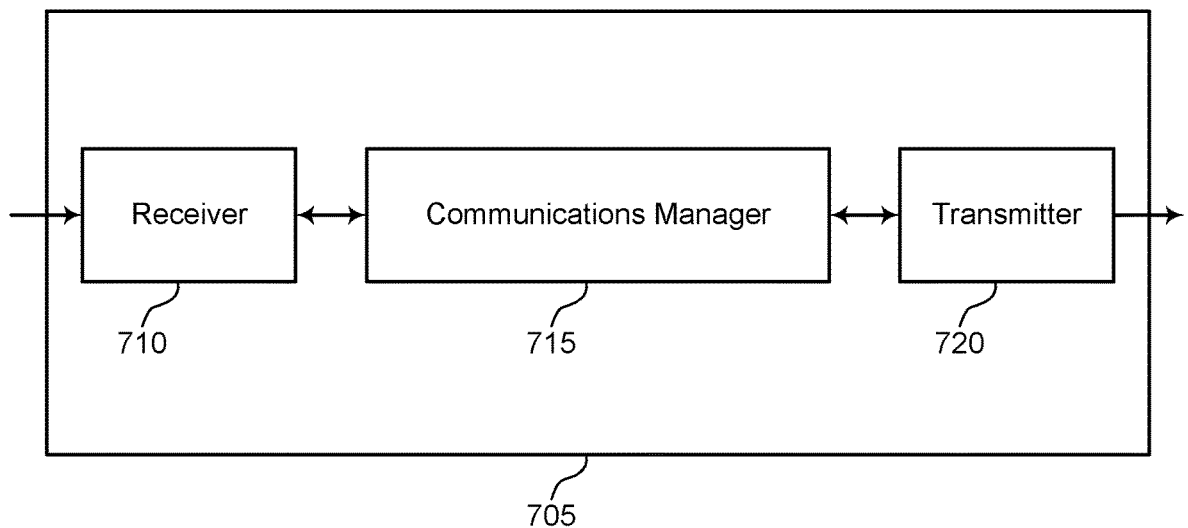
FIGS. 7 and 8 show block diagrams of devices that support feedback for multicast and broadcast messages in accordance with aspects of the present disclosure.

FIG. 7 shows a block diagram of a device 705 that supports feedback for multicast and broadcast messages in accordance with aspects of the present disclosure. The device 705 may be an example of aspects of a UE 115. The device 705 may include a receiver 710, a communications manager 715, and a transmitter 720. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to feedback for multicast and broadcast messages). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, an indication of a multicast acknowledgment configuration to enable acknowledgment feedback by the UE for multicast messages, receive, from the base station, a multicast data message, and transmit, to the base station, an acknowledgment feedback message in response to the received multicast data message based on the received indication of the multicast acknowledgment configuration.

In some examples, the communications manager 715 may determine a set of TTIs associated with an occasion for uplink acknowledgment feedback, the set of TTIs including at least a first TTI allocated for unicast downlink data for the UE and at least a second TTI allocated for multicast downlink data for the UE, monitor the set of TTIs for the unicast downlink data and the multicast downlink data, determine acknowledgment information for the monitored set of TTIs according to an acknowledgment codebook that includes TTIs allocated for unicast downlink data, including the first TTI, and excludes TTIs allocated for multicast downlink data, including the second TTI, and transmit, in the occasion for uplink acknowledgment feedback, a feedback message including the determined acknowledgment information.

In some examples, the communications manager 715 may receive, from a base station, a configuration indicating a schedule of occasions for multicast data messages on a multicast data channel, receive, from the base station, a configuration indicating a set of uplink control channel resources associated with the multicast data channel, monitor, according to the indicated schedule, a set of occasions for a set of multicast data messages on the multicast data channel, and transmit, to the base station, group-NACK feedback information on one or more uplink control channel resources of the set of uplink control channel resources based on the monitoring the set of occasions.

In some examples, the communications manager 715 may determine a configuration of UE-specific control channel resources for the UE to use to transmit acknowledgment feedback, receive, from a base station, first DCI scheduling transmission of a unicast data message and second DCI scheduling transmission of a multicast data message, monitor for the unicast data message according to the received first DCI and the multicast data message according to the received second DCI, and transmit, to the base station on the UE-specific control channel resources, first acknowledgment information in response to monitoring for the unicast data message and second acknowledgment information in response to monitoring for the multicast data message.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
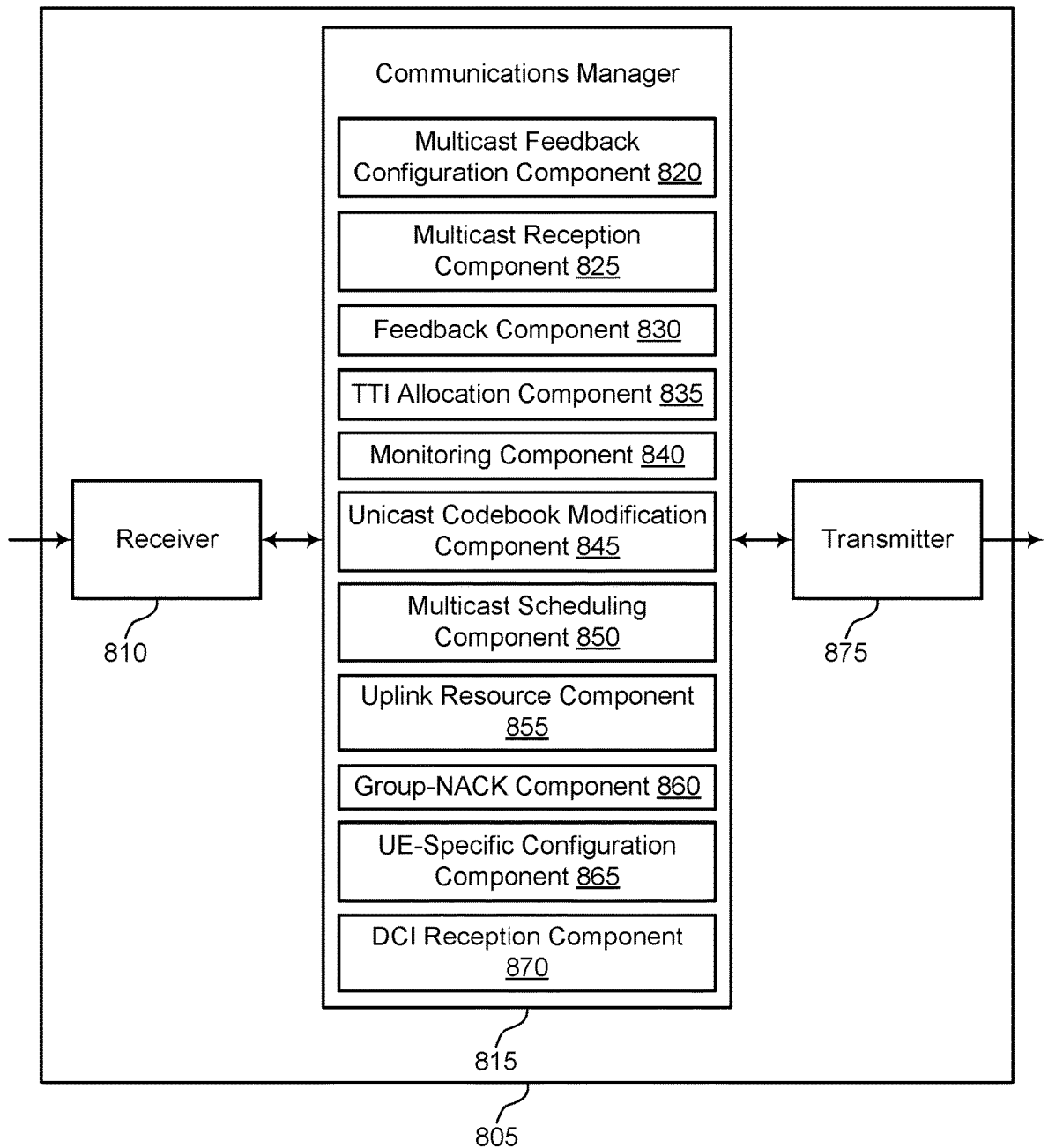

FIG. 8 shows a block diagram of a device 805 that supports feedback for multicast and broadcast messages in accordance with aspects of the present disclosure. The device 805 may be an example of aspects of a device 705 or a UE 115. The device 805 may include a receiver 810, a communications manager 815, and a transmitter 875. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to feedback for multicast and broadcast messages). Information may be passed on to other components of the device 805. The receiver 810 may be an example of aspects of the transceiver 1020 described with reference to FIG. 10. The receiver 810 may utilize a single antenna or a set of antennas.

The communications manager 815 may include a multicast feedback configuration component 820, a multicast reception component 825, a feedback component 830, a TTI allocation component 835, a monitoring component 840, a unicast codebook modification component 845, a multicast scheduling component 850, an uplink resource component 855, a group-NACK component 860, a UE-specific configuration component 865, and a DCI reception component 870.

The multicast feedback configuration component 820 may receive, from a base station, an indication of a multicast acknowledgment configuration to enable acknowledgment feedback by the UE for multicast messages. The multicast reception component 825 may receive, from the base station, a multicast data message. The feedback component 830 may transmit, to the base station, an acknowledgment feedback message in response to the received multicast data message based on the received indication of the multicast acknowledgment configuration.

The TTI allocation component 835 may determine a set of TTIs associated with an occasion for uplink acknowledgment feedback, the set of TTIs including at least a first TTI allocated for unicast downlink data for the UE and at least a second TTI allocated for multicast downlink data for the UE. The monitoring component 840 may monitor the set of TTIs for the unicast downlink data and the multicast downlink data. The unicast codebook modification component 845 may determine acknowledgment information for the monitored set of TTIs according to an acknowledgment codebook that includes TTIs allocated for unicast downlink data, including the first TTI, and excludes TTIs allocated for multicast downlink data, including the second TTI. The feedback component 830 may transmit, in the occasion for uplink acknowledgment feedback, a feedback message including the determined acknowledgment information.

The multicast scheduling component 850 may receive, from a base station, a configuration indicating a schedule of occasions for multicast data messages on a multicast data channel. The uplink resource component 855 may receive, from the base station, a configuration indicating a set of uplink control channel resources associated with the multicast data channel. The monitoring component 840 may monitor, according to the indicated schedule, a set of occasions for a set of multicast data messages on the multicast data channel. The group-NACK component 860 may transmit, to the base station, group-NACK feedback information on one or more uplink control channel resources of the set of uplink control channel resources based on the monitoring the set of occasions.

The UE-specific configuration component 865 may determine a configuration of UE-specific control channel resources for the UE to use to transmit acknowledgment feedback. The DCI reception component 870 may receive, from a base station, first DCI scheduling transmission of a unicast data message and second DCI scheduling transmission of a multicast data message. The monitoring component 840 may monitor for the unicast data message according to the received first DCI and the multicast data message according to the received second DCI. The feedback component 830 may transmit, to the base station on the UE-specific control channel resources, first acknowledgment information in response to monitoring for the unicast data message and second acknowledgment information in response to monitoring for the multicast data message.

The transmitter 875 may transmit signals generated by other components of the device 805. In some examples, the transmitter 875 may be collocated with a receiver 810 in a transceiver component. For example, the transmitter 875 may be an example of aspects of the transceiver 1020 described with reference to FIG. 10. The transmitter 875 may utilize a single antenna or a set of antennas.

Figure 9:
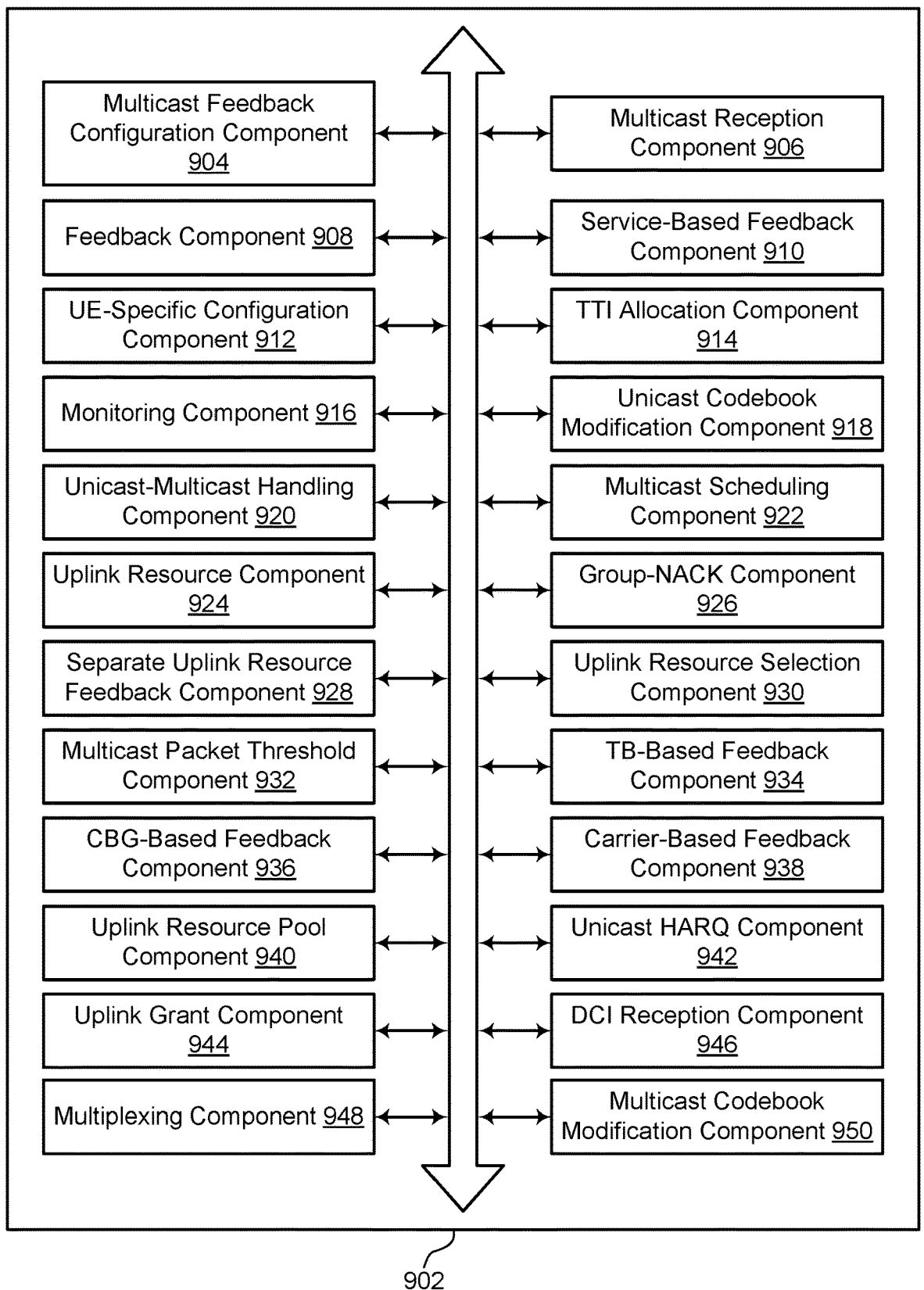
FIG. 9 shows a block diagram of a communications manager that supports feedback for multicast and broadcast messages in accordance with aspects of the present disclosure.

FIG. 9 shows a block diagram of a communications manager 902 that supports feedback for multicast and broadcast messages in accordance with aspects of the present disclosure. The communications manager 902 may be an example of aspects of a communications manager 715, a communications manager 815, or a communications manager 1010 described herein. The communications manager 902 may include a multicast feedback configuration component 904, a multicast reception component 906, a feedback component 908, a service-based feedback component 910, a UE-specific configuration component 912, a TTI allocation component 914, a monitoring component 916, a unicast codebook modification component 918, a unicast-multicast handling component 920, a multicast scheduling component 922, an uplink resource component 924, a group-NACK component 926, a separate uplink resource feedback component 928, an uplink resource selection component 930, a multicast packet threshold component 932, a TB-based feedback component 934, a CBG-based feedback component 936, a carrier-based feedback component 938, an uplink resource pool component 940, a unicast HARQ component 942, an uplink grant component 944, a DCI reception component 946, a multiplexing component 948, and a multicast codebook modification component 950. Each of these components may communicate, directly or indirectly, with one another (for example, via one or more buses). The communications manager 902 may be implemented at a UE 115.

In some implementations, the multicast feedback configuration component 904 may receive, from a base station, an indication of a multicast acknowledgment configuration to enable acknowledgment feedback by the UE for multicast messages. The multicast reception component 906 may receive, from the base station, a multicast data message. The feedback component 908 may transmit, to the base station, an acknowledgment feedback message in response to the received multicast data message based on the received indication of the multicast acknowledgment configuration.

The service-based feedback component 910 may enable the acknowledgment feedback for multicast messages for a service based on the multicast acknowledgment configuration being specific to the service. The acknowledgment feedback message may be transmitted based on the received multicast data message being associated with the service.

In some examples, the acknowledgment feedback is enabled for multicast messages for a first service, and the service-based feedback component 910 may determine that acknowledgment feedback is disabled for multicast messages for a second service based on the received indication of the multicast acknowledgment configuration. In some examples, the service-based feedback component 910 may receive, from the base station, a multicast data message for the second service and may refrain from transmitting an acknowledgment feedback message in response to the multicast data message for the second service based on determining that the acknowledgment feedback is disabled for multicast messages for the second service.

The UE-specific configuration component 912 may receive, from the base station, a UE-specific configuration message including the indication of the multicast acknowledgment configuration. In some examples, the UE-specific configuration component 912 may transmit one or both of a UE measurement report or a unicast CSI report. The UE-specific configuration message may be based on one or both of the UE measurement report or the unicast CSI report.

In some examples, the multicast feedback configuration component 904 may receive, from the base station on an MCCH, a multicast configuration message including the indication of the multicast acknowledgment configuration. The multicast acknowledgment configuration may be for a set of UEs and the multicast data message may be addressed to the set of UEs. In some examples, the multicast acknowledgment configuration includes one or more of a service-based criterion, a multicast RSRP threshold, an antenna configuration-specific threshold, or a probability for enabling the acknowledgment feedback for multicast messages.

In some implementations, the TTI allocation component 914 may determine a set of TTIs associated with an occasion for uplink acknowledgment feedback, the set of TTIs including at least a first TTI allocated for unicast downlink data for the UE and at least a second TTI allocated for multicast downlink data for the UE. In some examples, the first TTI includes a candidate occasion for a PDSCH transmission, and the second TTI includes a candidate occasion for an MTCH transmission.

The monitoring component 916 may monitor the set of TTIs for the unicast downlink data and the multicast downlink data. The unicast codebook modification component 918 may determine acknowledgment information for the monitored set of TTIs according to an acknowledgment codebook that includes TTIs allocated for unicast downlink data, including the first TTI, and excludes TTIs allocated for multicast downlink data, including the second TTI. The feedback component 908 may transmit, in the occasion for uplink acknowledgment feedback, a feedback message including the determined acknowledgment information.

In some examples, the unicast codebook modification component 918 may determine to exclude the TTIs allocated for multicast downlink data from the acknowledgment codebook based on the UE not supporting parallel monitoring of a unicast data channel and a multicast data channel. Additionally or alternatively, the unicast codebook modification component 918 may determine to exclude the TTIs allocated for multicast downlink data from the acknowledgment codebook based on the multicast downlink data having a first priority value greater than a second priority value for the unicast downlink data.

The unicast-multicast handling component 920 may transmit, to a base station, one or more of a multicast interest indication, a unicast interest indication, or a multicast-unicast parallel monitoring UE capability. The unicast codebook modification component 918 may determine to exclude the TTIs allocated for multicast downlink data from the acknowledgment codebook based on the transmitted one or more of the multicast interest indication, the unicast interest indication, or the multicast-unicast parallel monitoring UE capability.

In some examples, the unicast codebook modification component 918 may modify a semi-static acknowledgment codebook to remove acknowledgment information for the second TTI allocated for multicast downlink data. In some examples, the acknowledgment codebook includes a semi-static HARQ-Ack codebook.

In some implementations, the multicast scheduling component 922 may receive, from a base station, a configuration indicating a schedule of occasions for multicast data messages on a multicast data channel. The uplink resource component 924 may receive, from the base station, a configuration indicating a set of uplink control channel resources associated with the multicast data channel. In some examples, the configuration indicating the set of uplink control channel resources is transmitted via RRC signaling. In some examples, the configuration indicating the set of uplink control channel resources is one or both of service-specific or UE-specific.

The monitoring component 916 may monitor, according to the indicated schedule, a set of occasions for a set of multicast data messages on the multicast data channel. The group-NACK component 926 may transmit, to the base station, group-NACK feedback information on one or more uplink control channel resources of the set of uplink control channel resources based on the monitoring the set of occasions.

In some examples, the transmitting may involve a separate uplink resource feedback component 928 transmitting, to the base station in a first uplink control channel resource of the set of uplink control channel resources, a first group-NACK message in response to a first multicast data message of the set of multicast data messages and transmitting, to the base station in a second uplink control channel resource of the set of uplink control channel resources different than the first uplink control channel resource, a second group-NACK message in response to a second multicast data message of the set of multicast data messages.

In some examples, the first uplink control channel resource and the second uplink control channel resource are one or more of TDMed, FDMed, CDMed, or SDMed. In some examples, the first uplink control channel resource and the second uplink control channel resource are based on a capability of the UE to concurrently transmit the first group-NACK message and the second group-NACK message.

The uplink resource selection component 930 may determine, based on the monitoring, that the UE has failed to receive at least one multicast data message on the multicast data channel and may select the one or more uplink control channel resources of the set of uplink control channel resources for transmitting the group-NACK feedback information based on the at least one multicast data message that the UE failed to receive.

The multicast packet threshold component 932 may determine that a number of the set of multicast data messages for which the UE is to transmit the group-NACK feedback information is greater than a threshold number. The group-NACK feedback information may be transmitted based on the determining that the number is greater than the threshold number. In some examples, the multicast packet threshold component 932 may select the one or more uplink control channel resources of the set of uplink control channel resources for transmitting the group-NACK feedback information based on the number of the set of multicast data messages for which the UE is to transmit the group-NACK feedback information. In some examples, the group-NACK feedback information indicates a number of messages in the set of multicast data messages.

In some examples, based on the TB-based feedback component 934, the group-NACK feedback information includes TB-level group-NACK feedback information for the set of multicast data messages.

In some examples, based on the CBG-based feedback component 936, the group-NACK feedback information includes CBG-level group-NACK feedback information for the set of multicast data messages. At least one multicast data message of the set of multicast data messages may include a set of CBGs.

In some examples, the transmitting may involve the carrier-based feedback component 938 transmitting the group-NACK feedback information in response to the set of multicast data messages on each carrier of a set of carriers configured for multicast communications for the UE.

The uplink resource pool component 940 may receive a configuration of an uplink control channel resource pool and may select an uplink control channel resource from the uplink control channel resource pool for transmitting the group-NACK feedback information. In some examples, the configuration of the uplink control channel resource pool is one or both of UE-specific or service-specific.

In some examples, the uplink resource pool component 940 may receive, from the base station, DCI indicating the uplink control channel resource from the uplink control channel resource pool for transmitting the group-NACK feedback information. In some examples, the uplink resource pool component 940 may receive, from the base station, DCI indicating a subset of uplink control channel resources from the uplink control channel resource pool. The uplink control channel resource may be randomly selected from the subset of uplink control channel resources for transmitting the group-NACK feedback information. In some examples, the uplink control channel resource pool supports multicast feedback and unicast feedback.

In some examples, the monitoring component 916 may monitor for a unicast downlink message and the unicast HARQ component 942 may transmit, to the base station, a HARQ message in response to the unicast downlink message using a unicast HARQ codebook. In such examples, the HARQ message may be different than the group-NACK feedback information.

In some examples, the HARQ message and the group-NACK feedback information are transmitted concurrently. In some other examples, a first uplink control channel resource for transmitting the HARQ message is TDMed with a second uplink control channel resource for transmitting the group-NACK feedback information.

In some examples, the unicast HARQ component 942 may determine a CA configuration, in which a first uplink control channel group is configured for unicast feedback and a second uplink control channel group is configured for multicast feedback.

In some examples, the HARQ message is transmitted using one or both of a first TA value or a first power control value and the group-NACK feedback information is transmitted using one or both of a second TA value different than the first TA value or a second power control value different than the first power control value.

The uplink grant component 944 may receive, from the base station, an uplink grant for an uplink data transmission indicating an uplink data channel resource at least partially overlapping in time with an uplink control channel resource for transmitting the group-NACK feedback information and may transmit the uplink data transmission concurrently with the group-NACK feedback information.

In some implementations, the UE-specific configuration component 912 may determine a configuration of UE-specific control channel resources for the UE to use to transmit acknowledgment feedback. The DCI reception component 946 may receive, from a base station, first DCI scheduling transmission of a unicast data message and second DCI scheduling transmission of a multicast data message.

The monitoring component 916 may monitor for the unicast data message according to the received first DCI and the multicast data message according to the received second DCI. The feedback component 908 may transmit, to the base station on the UE-specific control channel resources, first acknowledgment information in response to monitoring for the unicast data message and second acknowledgment information in response to monitoring for the multicast data message.

In some examples, the feedback component 908 may generate a first acknowledgment message indicating the first acknowledgment information using a unicast-specific cDAI and a unicast-specific tDAI. Transmitting the first acknowledgment information may include transmitting the first acknowledgment message on a first UE-specific control channel resource of the UE-specific control channel resources. Additionally, the feedback component 908 may generate a second acknowledgment message indicating the second acknowledgment information using a multicast-specific cDAI and a multicast-specific tDAI. Transmitting the second acknowledgment information may include transmitting the second acknowledgment message on a second UE-specific control channel resource of the UE-specific control channel resources different than the first UE-specific control channel resource.

In some other examples, the feedback component 908 may generate an acknowledgment message indicating the first acknowledgment information and the second acknowledgment information using a unicast-specific sub-codebook and a multicast-specific sub-codebook. Transmitting the first acknowledgment information and transmitting the second acknowledgment information may include transmitting the acknowledgment message on a UE-specific control channel resource of the UE-specific control channel resources.

In some examples, the feedback component 908 may create the unicast-specific sub-codebook based on a unicast-specific cDAI and a unicast-specific tDAI and may create the multicast-specific sub-codebook based on a multicast-specific cDAI and a multicast-specific tDAI.

In some examples, the uplink grant component 944 may receive, from the base station, third DCI including an uplink grant for an uplink data transmission by the UE. The uplink grant may include a unicast-specific tDAI and a multicast-specific tDAI. The multiplexing component 948 may multiplex the acknowledgment message indicating the first acknowledgment information and the second acknowledgment information with the uplink data transmission based on the unicast-specific tDAI and the multicast-specific tDAI. In some examples, CBG-based feedback may be enabled, the uplink grant may include a unicast-specific TB-based tDAI, a unicast-specific CBG-based tDAI, a multicast-specific TB-based tDAI, and a multicast-specific CBG-based tDAI, and the multiplexing may be based on the unicast-specific TB-based tDAI, the unicast-specific CBG-based tDAI, the multicast-specific TB-based tDAI, and the multicast-specific CBG-based tDAI.

In some other examples, the uplink grant component 944 may receive, from the base station, third DCI including an uplink grant for an uplink data transmission by the UE. The uplink grant may include a tDAI for both unicast and multicast. The multiplexing component 948 may multiplex the acknowledgment message indicating the first acknowledgment information and the second acknowledgment information with the uplink data transmission based on the tDAI for both unicast and multicast. In some examples, CBG-based feedback may be enabled, the uplink grant includes a TB-based tDAI for both unicast and multicast and a CBG-based tDAI for both unicast and multicast, and the multiplexing is based on the TB-based tDAI for both unicast and multicast and the CBG-based tDAI for both unicast and multicast.

The multicast codebook modification component 950 may refrain from monitoring for one or more multicast data messages based on an overlap between one or more occasions for unicast data transmissions scheduled by the first DCI and one or more occasions for multicast data transmissions scheduled by the second DCI. The multicast codebook modification component 950 may modify a semi-static multicast acknowledgment codebook to remove acknowledgment information for the one or more multicast data messages based on the refraining from monitoring for the one or more multicast data messages and may generate the second acknowledgment information using the modified semi-static multicast acknowledgment codebook. In some examples, the refraining from monitoring for the one or more multicast data messages is based on the UE not supporting parallel monitoring of the one or more occasions for multicast data transmissions and the one or more occasions for the unicast data transmissions and the unicast data transmissions having a first priority value greater than a second priority value for the multicast data transmissions.

Figure 10:
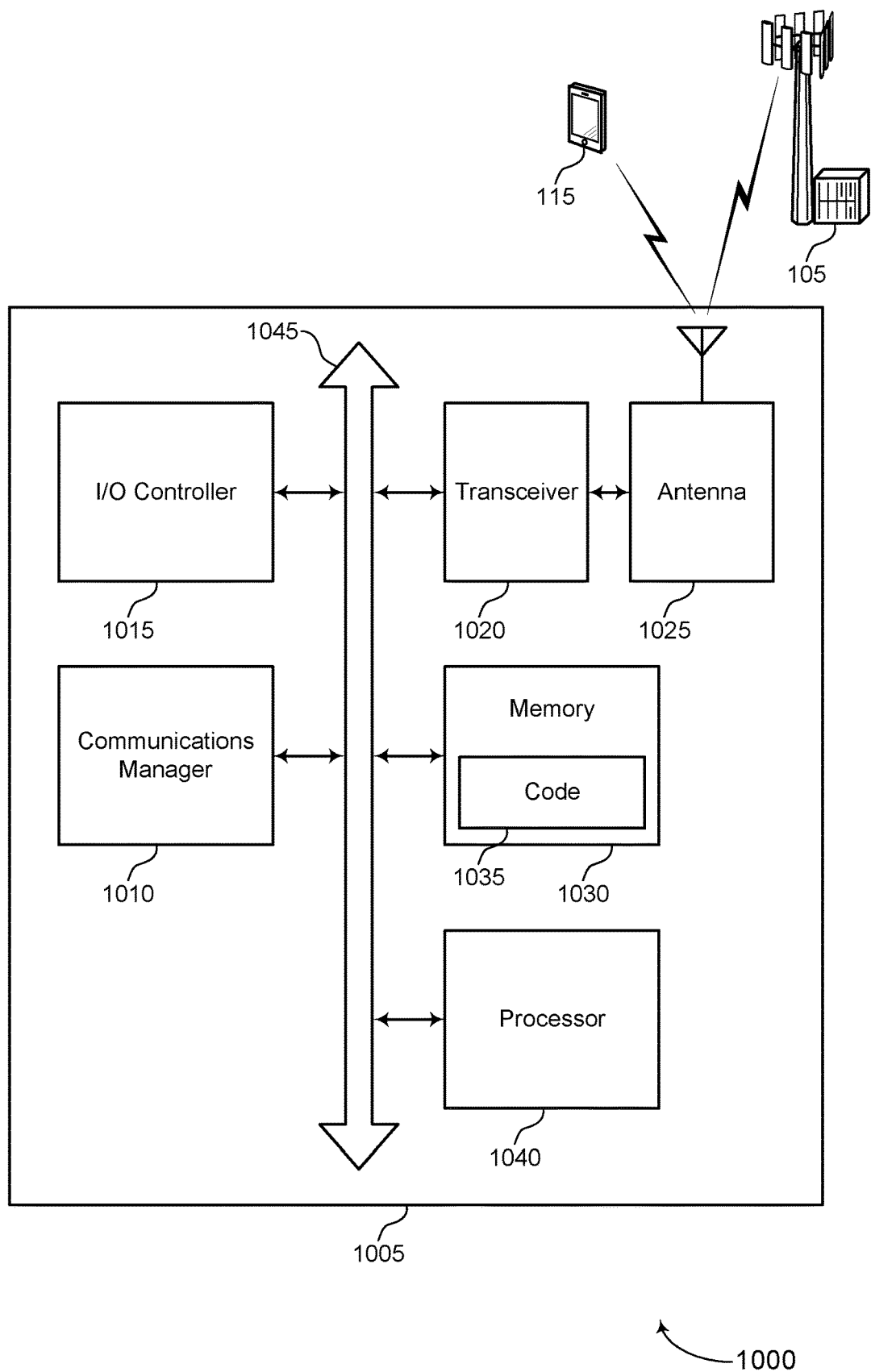
FIG. 10 shows a diagram of a system including a device that supports feedback for multicast and broadcast messages in accordance with aspects of the present disclosure.

FIG. 10 shows a diagram of a system 1000 including a device 1005 that supports feedback for multicast and broadcast messages in accordance with aspects of the present disclosure. The device 1005 may be an example of or include the components of device 705, device 805, or a UE 115. The device 1005 may include components for bi-directional voice and data communications including components for transmitting and receiving communications, including a communications manager 1010, an input/output (I/O) controller 1015, a transceiver 1020, an antenna 1025, memory 1030, and a processor 1040. These components may be in electronic communication via one or more buses (for example, bus 1045). The communications manager 1010 may perform any of the operations described herein with reference to a communications manager 715, 815, or 902.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some examples, the I/O controller 1015 may utilize an operating system such as iOS®, ANDROID®, MS-DOS®, MS-WINDOWS®, OS/2®, UNIX®, LINUX®, or another known operating system. In other examples, the I/O controller 1015 may represent or interact with a modem, a keyboard, a mouse, a touchscreen, or a similar device. In some examples, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some examples, the wireless device may include a single antenna 1025. However, in some examples the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when or if executed, cause the processor to perform various functions described herein. In some examples, the memory 1030 may contain, among other things, a basic I/O system (BIOS) which may control basic hardware or software operation such as the interaction with peripheral components or devices.

The processor 1040 may include an intelligent hardware device (for example, a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some examples, the processor 1040 may be configured to operate a memory array using a memory controller. In other examples, a memory controller may be integrated into the processor 1040. The processor 1040 may be configured to execute computer-readable instructions stored in the memory 1030 to cause the device 1005 to perform various functions (for example, functions or tasks supporting feedback for multicast and broadcast messages).

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (for example, when or if compiled and executed) to perform functions described herein.

Figure 11:
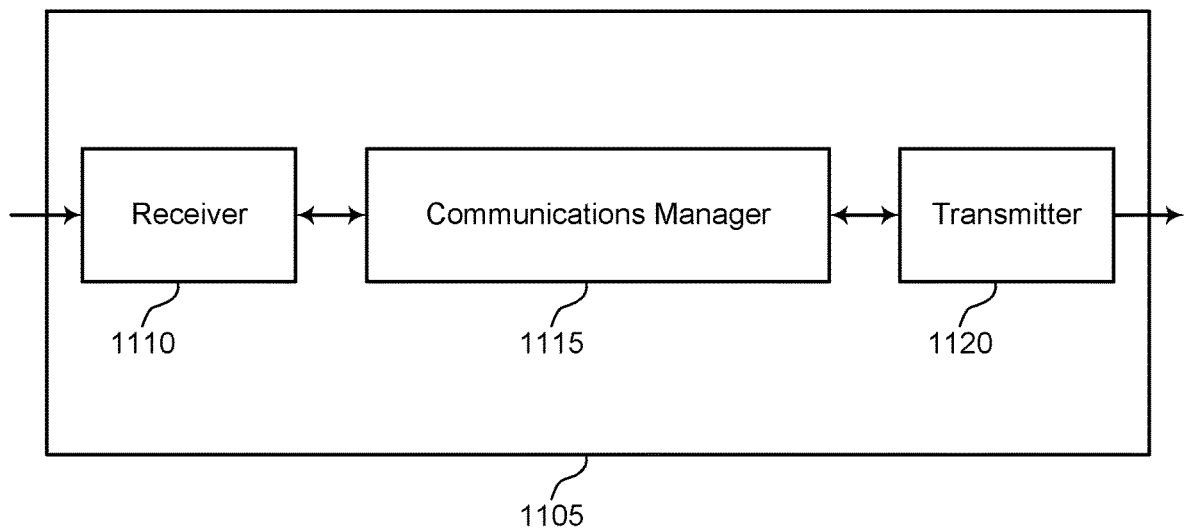
FIGS. 11 and 12 show block diagrams of devices that support feedback for multicast and broadcast messages in accordance with aspects of the present disclosure.

FIG. 11 shows a block diagram of a device 1105 that supports feedback for multicast and broadcast messages in accordance with aspects of the present disclosure. The device 1105 may be an example of aspects of a base station 105. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to feedback for multicast and broadcast messages). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, an indication of a multicast acknowledgment configuration to enable acknowledgment feedback by the UE for multicast messages, transmit, to the UE, a multicast data message, and receive, from the UE and based on the indication of the multicast acknowledgment configuration, an acknowledgment feedback message in response to the multicast data message.

In some examples, the communications manager 1115 may transmit, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE, transmit, to the UE, a unicast downlink data message in the first TTI, and receive, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI.

In some examples, the communications manager 1115 may transmit, to a UE, a configuration indicating a schedule of occasions for multicast data messages on a multicast data channel, transmit, to the UE, a configuration indicating a set of uplink control channel resources associated with the multicast data channel, transmit, to a set of UEs including the UE, a set of multicast data messages in a set of occasions on the multicast data channel, and receive, from at least the UE, group-NACK feedback information on one or more uplink control channel resources of the set of uplink control channel resources based on the UE failing to receive at least one multicast data message of the set of multicast data messages.

In some examples, the communications manager 1115 may transmit, to a UE, a configuration of UE-specific control channel resources for the UE to use to transmit acknowledgment feedback, transmit, to the UE, first DCI scheduling transmission of a unicast data message and second DCI scheduling transmission of a multicast data message, transmit, to the UE, the unicast data message and the multicast data message, and receive, from the UE on the UE-specific control channel resources, first acknowledgment information in response to the unicast data message and second acknowledgment information in response to the multicast data message.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
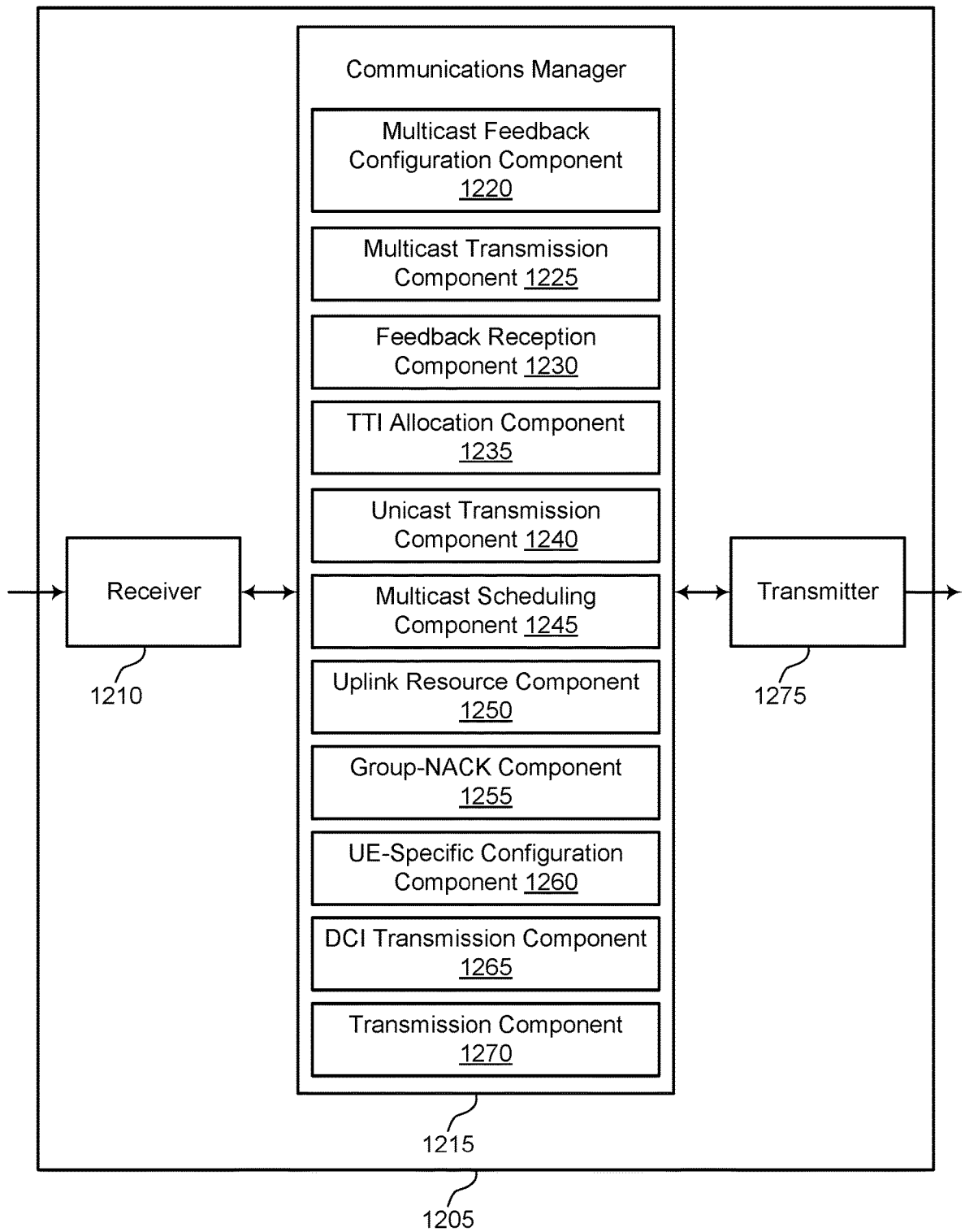

FIG. 12 shows a block diagram of a device 1205 that supports feedback for multicast and broadcast messages in accordance with aspects of the present disclosure. The device 1205 may be an example of aspects of a device 1105 or a base station 105. The device 1205 may include a receiver 1210, a communications manager 1215, and a transmitter 1275. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to feedback for multicast and broadcast messages). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may include a multicast feedback configuration component 1220, a multicast transmission component 1225, a feedback reception component 1230, a TTI allocation component 1235, a unicast transmission component 1240, a multicast scheduling component 1245, an uplink resource component 1250, a group-NACK component 1255, a UE-specific configuration component 1260, a DCI transmission component 1265, and a transmission component 1270.

The multicast feedback configuration component 1220 may transmit, to a UE, an indication of a multicast acknowledgment configuration to enable acknowledgment feedback by the UE for multicast messages. The multicast transmission component 1225 may transmit, to the UE, a multicast data message. The feedback reception component 1230 may receive, from the UE and based on the indication of the multicast acknowledgment configuration, an acknowledgment feedback message in response to the multicast data message.

The TTI allocation component 1235 may transmit, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE. The unicast transmission component 1240 may transmit, to the UE, a unicast downlink data message in the first TTI. The feedback reception component 1230 may receive, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI.

The multicast scheduling component 1245 may transmit, to a UE, a configuration indicating a schedule of occasions for multicast data messages on a multicast data channel. The uplink resource component 1250 may transmit, to the UE, a configuration indicating a set of uplink control channel resources associated with the multicast data channel. The multicast transmission component 1225 may transmit, to a set of UEs including the UE, a set of multicast data messages in a set of occasions on the multicast data channel. The group-NACK component 1255 may receive, from at least the UE, group-NACK feedback information on one or more uplink control channel resources of the set of uplink control channel resources based on the UE failing to receive at least one multicast data message of the set of multicast data messages.

The UE-specific configuration component 1260 may transmit, to a UE, a configuration of UE-specific control channel resources for the UE to use to transmit acknowledgment feedback. The DCI transmission component 1265 may transmit, to the UE, first DCI scheduling transmission of a unicast data message and second DCI scheduling transmission of a multicast data message. The transmission component 1270 may transmit, to the UE, the unicast data message and the multicast data message. The feedback reception component 1230 may receive, from the UE on the UE-specific control channel resources, first acknowledgment information in response to the unicast data message and second acknowledgment information in response to the multicast data message.

The transmitter 1275 may transmit signals generated by other components of the device 1205. In some examples, the transmitter 1275 may be collocated with a receiver 1210 in a transceiver component. For example, the transmitter 1275 may be an example of aspects of the transceiver 1420 described with reference to FIG. 14. The transmitter 1275 may utilize a single antenna or a set of antennas.

Figure 13:
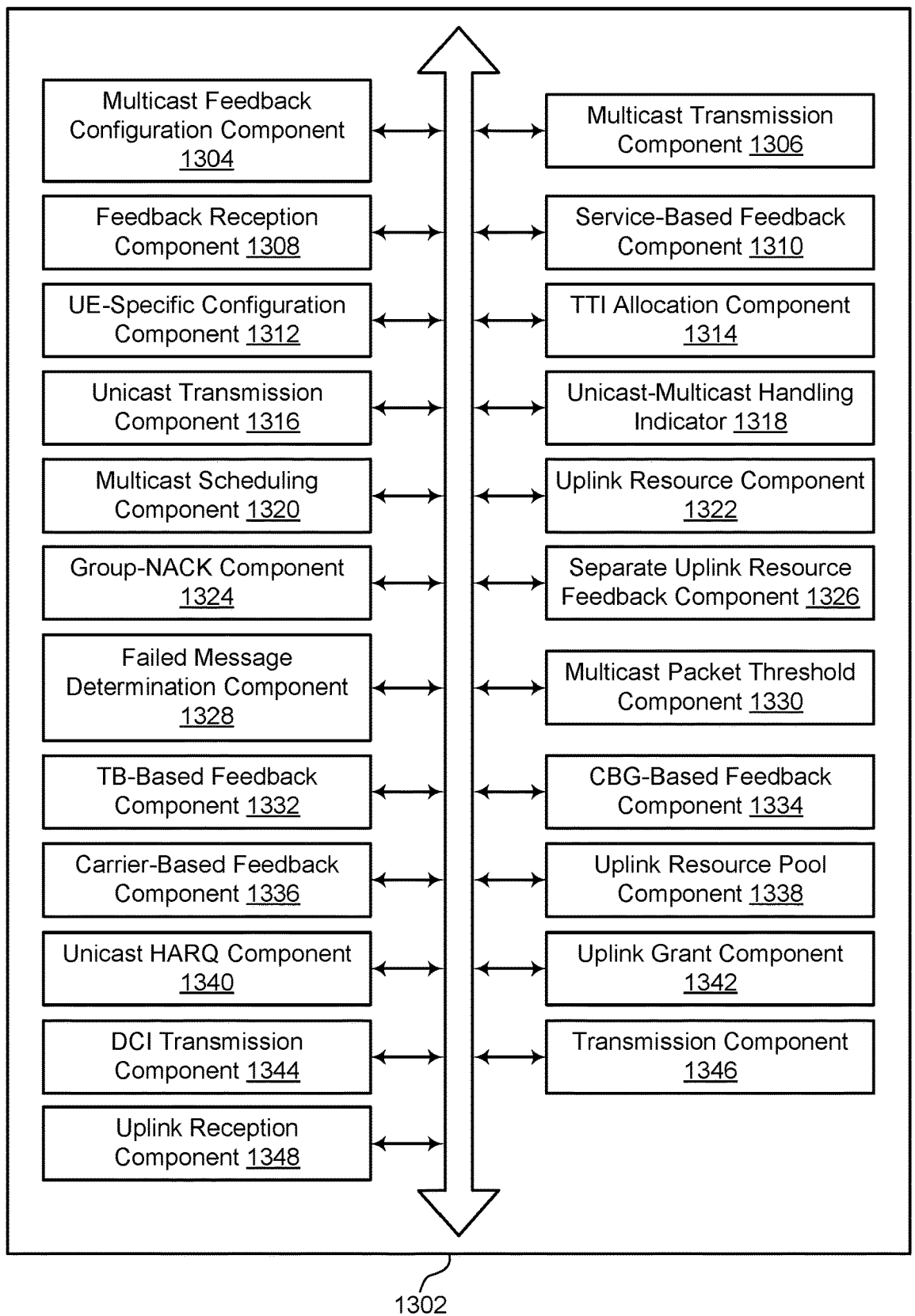
FIG. 13 shows a block diagram of a communications manager that supports feedback for multicast and broadcast messages in accordance with aspects of the present disclosure.

FIG. 13 shows a block diagram of a communications manager 1302 that supports feedback for multicast and broadcast messages in accordance with aspects of the present disclosure. The communications manager 1302 may be an example of aspects of a communications manager 1115, a communications manager 1215, or a communications manager 1410 described herein. The communications manager 1302 may include a multicast feedback configuration component 1304, a multicast transmission component 1306, a feedback reception component 1308, a service-based feedback component 1310, a UE-specific configuration component 1312, a TTI allocation component 1314, a unicast transmission component 1316, a unicast-multicast handling indicator 1318, a multicast scheduling component 1320, an uplink resource component 1322, a group-NACK component 1324, a separate uplink resource feedback component 1326, a failed message determination component 1328, a multicast packet threshold component 1330, a TB-based feedback component 1332, a CBG-based feedback component 1334, a carrier-based feedback component 1336, an uplink resource pool component 1338, a unicast HARQ component 1340, an uplink grant component 1342, a DCI transmission component 1344, a transmission component 1346, and an uplink reception component 1348. Each of these components may communicate, directly or indirectly, with one another (for example, via one or more buses). The communications manager 1302 may be implemented at a base station 105.

In some implementations, the multicast feedback configuration component 1304 may transmit, to a UE, an indication of a multicast acknowledgment configuration to enable acknowledgment feedback by the UE for multicast messages. The multicast transmission component 1306 may transmit, to the UE, a multicast data message. The feedback reception component 1308 may receive, from the UE and based on the indication of the multicast acknowledgment configuration, an acknowledgment feedback message in response to the multicast data message.

In some examples, the multicast acknowledgment configuration is specific to a service and enables acknowledgment feedback for multicast messages for the service, and the acknowledgment feedback message is received based on the multicast data message being associated with the service. In some examples, the service is a first service and the service-based feedback component 1310 may transmit, to the UE, a multicast data message for a second service. Acknowledgment feedback may be disabled for multicast messages for the second service. In some examples, the service-based feedback component 1310 may retransmit, to the UE, the multicast data message for the second service according to an RRC retransmission procedure. In some examples, the service-based feedback component 1310 may configure the UE with the multicast acknowledgment configuration enabling the acknowledgment feedback for multicast messages for the service based on a latency threshold for the service.

The UE-specific configuration component 1312 may transmit, to the UE, a UE-specific configuration message including the indication of the multicast acknowledgment configuration. In some examples, the UE-specific configuration component 1312 may receive one or both of a UE measurement report or a unicast CSI report. The UE-specific configuration message may be based on one or both of the UE measurement report or the unicast CSI report.

In some examples, the multicast feedback configuration component 1304 may transmit, to the UE on an MCCH, a multicast configuration message including the indication of the multicast acknowledgment configuration. The multicast acknowledgment configuration may be for a set of UEs and the multicast data message may be addressed to the set of UEs. In some examples, the multicast acknowledgment configuration includes one or more of a service-based criterion, a multicast RSRP threshold, an antenna configuration-specific threshold, or a probability for enabling the acknowledgment feedback for multicast messages.

In some implementations, the TTI allocation component 1314 may transmit, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE. In some examples, the first TTI includes a candidate occasion for a PDSCH transmission, and the second TTI includes a candidate occasion for an MTCH transmission.

The unicast transmission component 1316 may transmit, to the UE, a unicast downlink data message in the first TTI. The feedback reception component 1308 may receive, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI. In some examples, the acknowledgment codebook is a semi-static HARQ-Ack codebook.

The unicast-multicast handling indicator 1318 may receive, from the UE, one or more of a multicast interest indication, a unicast interest indication, or a multicast-unicast parallel monitoring UE capability and may determine that the acknowledgment codebook includes TTIs allocated for unicast downlink data, including the first TTI, and excludes TTIs allocated for multicast downlink data, including the second TTI, based on the received one or more of the multicast interest indication, the unicast interest indication, or the multicast-unicast parallel monitoring UE capability.

In some implementations, the multicast scheduling component 1320 may transmit, to a UE, a configuration indicating a schedule of occasions for multicast data messages on a multicast data channel. The uplink resource component 1322 may transmit, to the UE, a configuration indicating a set of uplink control channel resources associated with the multicast data channel. In some examples, the configuration indicating the set of uplink control channel resources is transmitted via RRC signaling. In some examples, the configuration indicating the set of uplink control channel resources is one or both of service-specific or UE-specific.

The multicast transmission component 1306 may transmit, to a set of UEs including the UE, a set of multicast data messages in a set of occasions on the multicast data channel. The group-NACK component 1324 may receive, from at least the UE, group-NACK feedback information on one or more uplink control channel resources of the set of uplink control channel resources based on the UE failing to receive at least one multicast data message of the set of multicast data messages. In some examples, the group-NACK component 1324 may receive, from a set of UEs of the set of UEs, the group-NACK feedback information on the one or more uplink control channel resources.

In some examples, the receiving may involve the separate uplink resource feedback component 1326 receiving, from the UE in a first uplink control channel resource of the set of uplink control channel resources, a first group-NACK message in response to a first multicast data message of the set of multicast data messages and receiving, from the UE in a second uplink control channel resource of the set of uplink control channel resources different than the first uplink control channel resource, a second group-NACK message in response to a second multicast data message of the set of multicast data messages. In some examples, the first uplink control channel resource and the second uplink control channel resource are one or more of TDMed, FDMed, CDMed, or SDMed.

The failed message determination component 1328 may determine the at least one multicast data message that the UE failed to receive based on the one or more uplink control channel resources on which the group-NACK feedback information is received.

The multicast packet threshold component 1330 may determine a threshold number of the set of multicast data messages that the UE failed to receive based on receiving the group-NACK feedback information. In some examples, the multicast packet threshold component 1330 may transmit, to the UE and based on the threshold number of the set of multicast data messages that the UE failed to receive, one or more of a repair packet, a rate-adaptation for the schedule, or an updated contention window.

In some examples, the multicast packet threshold component 1330 may determine a number of the set of multicast data messages that the UE failed to receive based on the one or more uplink control channel resources on which the group-NACK feedback information is received.

In some examples, the TB-based feedback component 1332 may configure the UE for TB-level feedback for the set of multicast data messages. In some other examples, the CBG-based feedback component 1334 may configure the UE for CBG-level feedback for the set of multicast data messages, and the group-NACK feedback information includes CBG-level group-NACK feedback information for the set of multicast data messages. The carrier-based feedback component 1336 may configure the UE with a set of carriers for multicast communications. The receiving may include receiving, from the UE, the group-NACK feedback information in response to the set of multicast data messages on each carrier of the set of carriers configured for multicast communications.

The uplink resource pool component 1338 may transmit, to the UE, a configuration of an uplink control channel resource pool including the one or more uplink control channel resources on which the group-NACK feedback information is received. In some examples, the configuration of the uplink control channel resource pool is one or both of UE-specific or service-specific.

In some examples, the uplink resource pool component 1338 may transmit, to the UE, DCI indicating the one or more uplink control channel resources from the uplink control channel resource pool for transmitting the group-NACK feedback information. In some examples, the uplink resource pool component 1338 may transmit, to the UE, DCI indicating a subset of uplink control channel resources from the uplink control channel resource pool. The one or more uplink control channel resources on which the group-NACK feedback information is received may be randomly selected from the subset of uplink control channel resources.

In some examples, the unicast transmission component 1316 may transmit, to the UE, a unicast downlink message and the unicast HARQ component 1340 may receive, from the UE, a HARQ message in response to the unicast downlink message. The HARQ message may be based on a unicast HARQ codebook and may be different than the group-NACK feedback information. In some examples, the HARQ message and the group-NACK feedback information are received concurrently. In some other examples, a first uplink control channel resource for receiving the HARQ message is TDMed with a second uplink control channel resource for receiving the group-NACK feedback information. In some examples, the HARQ message is received using one or both of a first TA value or a first power control value, and the group-NACK feedback information is received using one or both of a second TA value different than the first TA value or a second power control value different than the first power control value.

The uplink grant component 1342 may transmit, to the UE, an uplink grant for an uplink data transmission indicating an uplink data channel resource at least partially overlapping in time with an uplink control channel resource for receiving the group-NACK feedback information and may receive, from the UE, the uplink data transmission concurrently with the group-NACK feedback information.

In some implementations, the UE-specific configuration component 1312 may transmit, to a UE, a configuration of UE-specific control channel resources for the UE to use to transmit acknowledgment feedback. The DCI transmission component 1344 may transmit, to the UE, first DCI scheduling transmission of a unicast data message and second DCI scheduling transmission of a multicast data message.

The transmission component 1346 may transmit, to the UE, the unicast data message and the multicast data message. The feedback reception component 1308 may receive, from the UE on the UE-specific control channel resources, first acknowledgment information in response to the unicast data message and second acknowledgment information in response to the multicast data message.

In some examples, the receiving may involve the feedback reception component 1308 receiving a first acknowledgment message including the first acknowledgment information in a first uplink control channel resource of the UE-specific control channel resources and receiving a second acknowledgment message including the second acknowledgment information in a second uplink control channel resource of the UE-specific control channel resources different than the first uplink control channel resource.

In some other examples, the receiving may involve the feedback reception component 1308 receiving an acknowledgment message including the first acknowledgment information and the second acknowledgment information in an uplink control channel resource of the UE-specific control channel resources.

In some examples, the uplink grant component 1342 may transmit, to the UE, third DCI including an uplink grant for an uplink data transmission by the UE. The uplink grant may include a unicast-specific tDAI and a multicast-specific tDAI. The uplink reception component 1348 may receive, from the UE, the uplink data transmission multiplexed with the acknowledgment message based on the unicast-specific tDAI and the multicast-specific tDAI. In some examples, CBG-based feedback may be enabled, the uplink grant may include a unicast-specific TB-based tDAI, a unicast-specific CBG-based tDAI, a multicast-specific TB-based tDAI, and a multicast-specific CBG-based tDAI, and the uplink data transmission may be multiplexed with the acknowledgment message based on the unicast-specific TB-based tDAI, the unicast-specific CBG-based tDAI, the multicast-specific TB-based tDAI, and the multicast-specific CBG-based tDAI.

In some examples, the uplink grant component 1342 may transmit, to the UE, third DCI including an uplink grant for an uplink data transmission by the UE. The uplink grant may include a tDAI for both unicast and multicast. The uplink reception component 1348 may receive, from the UE, the uplink data transmission multiplexed with the acknowledgment message based on the tDAI for both unicast and multicast. In some examples, CBG-based feedback may be enabled, the uplink grant may include a TB-based tDAI for both unicast and multicast and a CBG-based tDAI for both unicast and multicast, and the uplink data transmission may be multiplexed with the acknowledgment message based on the TB-based tDAI for both unicast and multicast and the CBG-based tDAI for both unicast and multicast.

Figure 14:
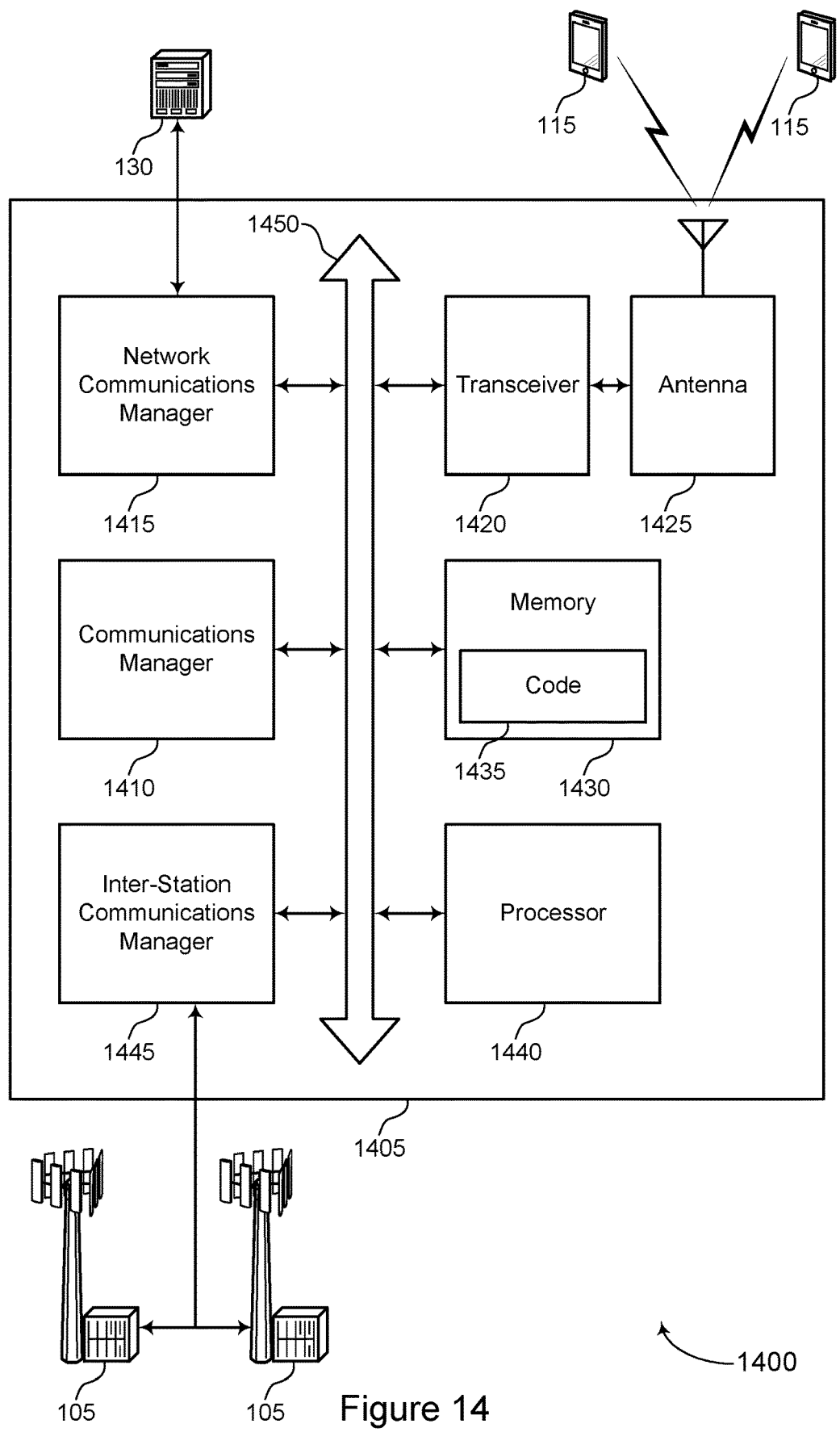
FIG. 14 shows a diagram of a system including a device that supports feedback for multicast and broadcast messages in accordance with aspects of the present disclosure.

FIG. 14 shows a diagram of a system 1400 including a device 1405 that supports feedback for multicast and broadcast messages in accordance with aspects of the present disclosure. The device 1405 may be an example of or include the components of device 1105, device 1205, or a base station 105. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, bus 1450). The communications manager 1410 may perform any of the operations described herein with reference to a communications manager 1115, 1215, or 1302.

The network communications manager 1415 may manage communications with the core network 130 (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some examples the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when or if executed by a processor (for example, the processor 1440) cause the device to perform various functions described herein. In some examples, the memory 1430 may contain, among other things, a BIOS which may control basic hardware or software operation such as the interaction with peripheral components or devices.

The processor 1440 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In some examples, a memory controller may be integrated into processor 1440. The processor 1440 may be configured to execute computer-readable instructions stored in the memory 1430 to cause the device 1405 to perform various functions (for example, functions or tasks supporting feedback for multicast and broadcast messages).

The inter-station communications manager 1445 may manage communications with other base station 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (for example, when or if compiled and executed) to perform functions described herein.

Figure 15:
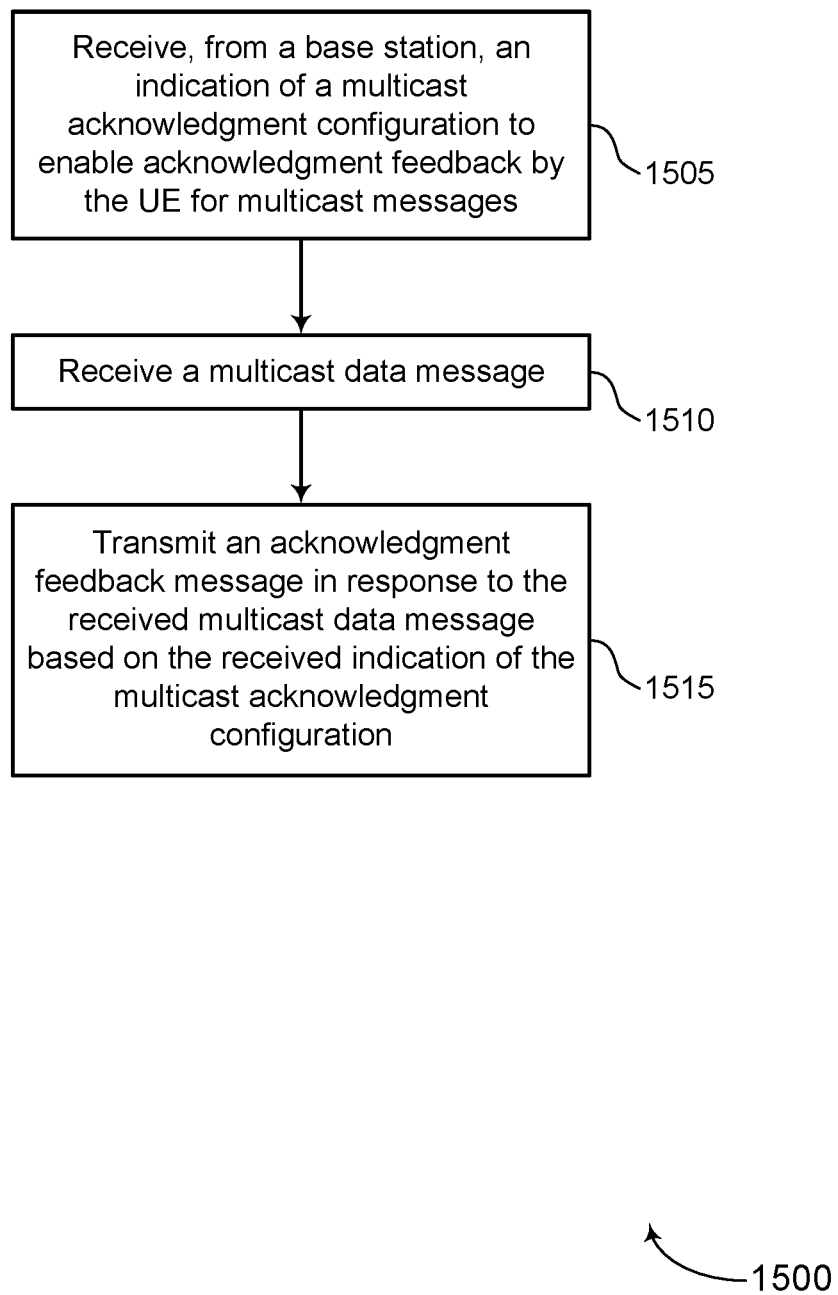
FIGS. 15-22 show flowcharts illustrating methods that support feedback for multicast and broadcast messages in accordance with aspects of the present disclosure.

FIG. 15 shows a flowchart illustrating a method 1500 that supports feedback for multicast and broadcast messages in accordance with aspects of the present disclosure. The operations of method 1500 may be implemented by a UE 115 or its components. For example, the operations of method 1500 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a multicast acknowledgment configuration to enable acknowledgment feedback by the UE for multicast messages. The operations of 1505 may be performed according to the methods described herein. In some examples, aspects of the operations of 1505 may be performed by a multicast feedback configuration component as described with reference to FIGS. 7-10.

At 1510, the UE may receive, from the base station, a multicast data message. The operations of 1510 may be performed according to the methods described herein. In some examples, aspects of the operations of 1510 may be performed by a multicast reception component as described with reference to FIGS. 7-10.

At 1515, the UE may transmit, to the base station, an acknowledgment feedback message in response to the received multicast data message based on the received indication of the multicast acknowledgment configuration. The operations of 1515 may be performed according to the methods described herein. In some examples, aspects of the operations of 1515 may be performed by a feedback component as described with reference to FIGS. 7-10.

Figure 16:
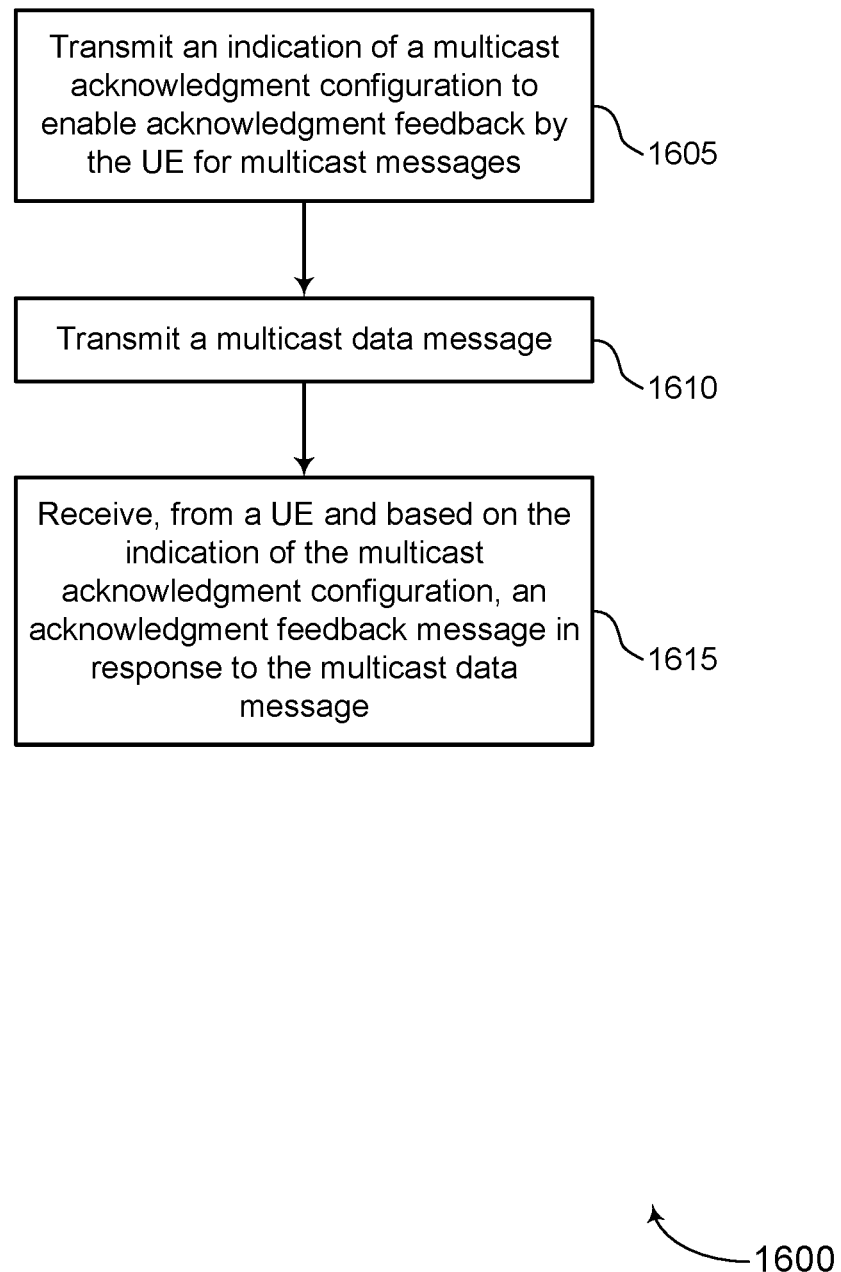

FIG. 16 shows a flowchart illustrating a method 1600 that supports feedback for multicast and broadcast messages in accordance with aspects of the present disclosure. The operations of method 1600 may be implemented by a base station 105 or its components. For example, the operations of method 1600 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1605, the base station may transmit, to a UE, an indication of a multicast acknowledgment configuration to enable acknowledgment feedback by the UE for multicast messages. The operations of 1605 may be performed according to the methods described herein. In some examples, aspects of the operations of 1605 may be performed by a multicast feedback configuration component as described with reference to FIGS. 11-14.

At 1610, the base station may transmit, to the UE, a multicast data message. The operations of 1610 may be performed according to the methods described herein. In some examples, aspects of the operations of 1610 may be performed by a multicast transmission component as described with reference to FIGS. 11-14.

At 1615, the base station may receive, from the UE and based on the indication of the multicast acknowledgment configuration, an acknowledgment feedback message in response to the multicast data message. The operations of 1615 may be performed according to the methods described herein. In some examples, aspects of the operations of 1615 may be performed by a feedback reception component as described with reference to FIGS. 11-14.

Figure 17:
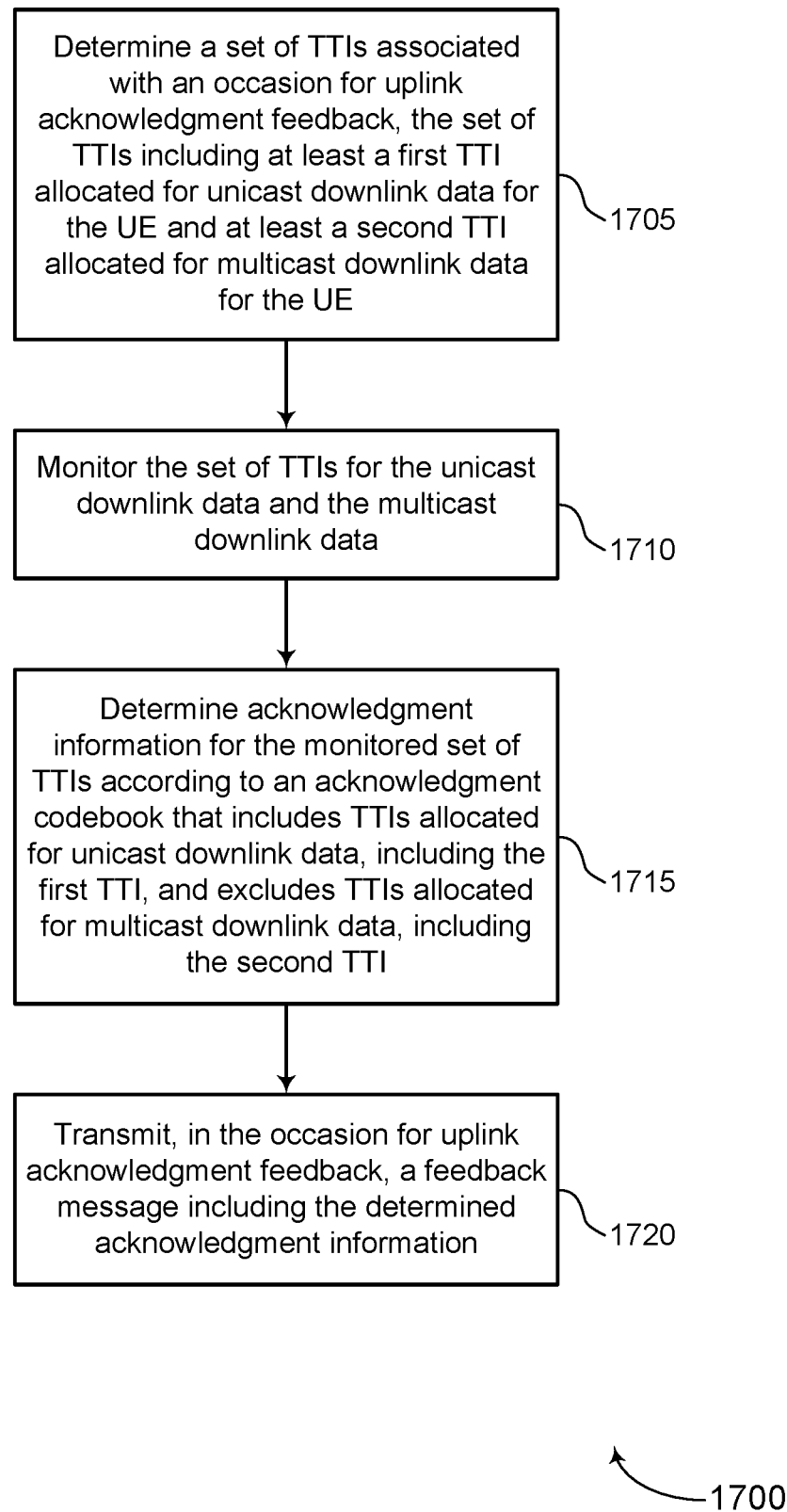

FIG. 17 shows a flowchart illustrating a method 1700 that supports feedback for multicast and broadcast messages in accordance with aspects of the present disclosure. The operations of method 1700 may be implemented by a UE 115 or its components. For example, the operations of method 1700 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1705, the UE may determine a set of TTIs associated with an occasion for uplink acknowledgment feedback, the set of TTIs including at least a first TTI allocated for unicast downlink data for the UE and at least a second TTI allocated for multicast downlink data for the UE. The operations of 1705 may be performed according to the methods described herein. In some examples, aspects of the operations of 1705 may be performed by a TTI allocation component as described with reference to FIGS. 7-10.

At 1710, the UE may monitor the set of TTIs for the unicast downlink data and the multicast downlink data. The operations of 1710 may be performed according to the methods described herein. In some examples, aspects of the operations of 1710 may be performed by a monitoring component as described with reference to FIGS. 7-10.

At 1715, the UE may determine acknowledgment information for the monitored set of TTIs according to an acknowledgment codebook that includes TTIs allocated for unicast downlink data, including the first TTI, and excludes TTIs allocated for multicast downlink data, including the second TTI. The operations of 1715 may be performed according to the methods described herein. In some examples, aspects of the operations of 1715 may be performed by a unicast codebook modification component as described with reference to FIGS. 7-10.

At 1720, the UE may transmit, in the occasion for uplink acknowledgment feedback, a feedback message including the determined acknowledgment information. The operations of 1720 may be performed according to the methods described herein. In some examples, aspects of the operations of 1720 may be performed by a feedback component as described with reference to FIGS. 7-10.

Figure 18:
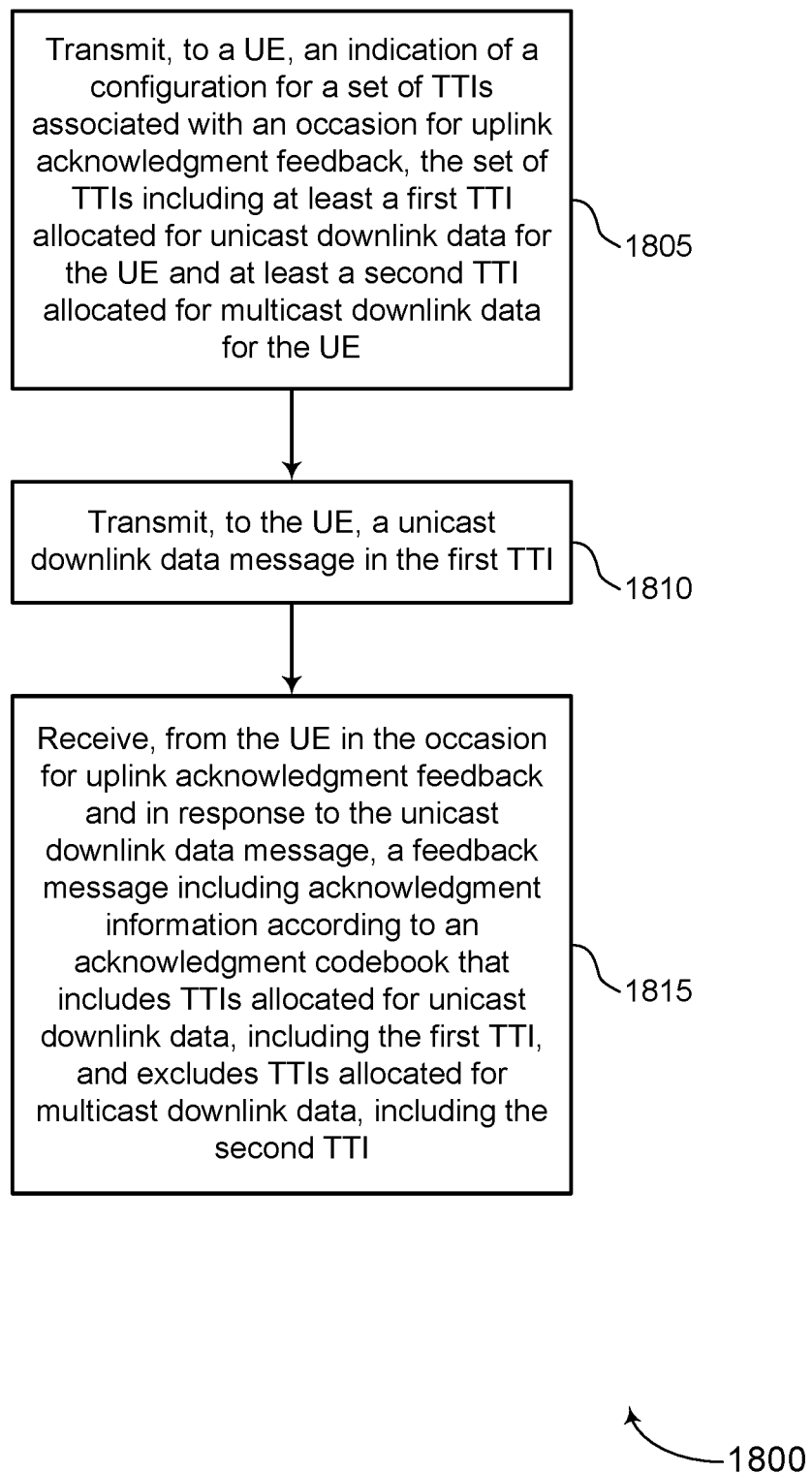

FIG. 18 shows a flowchart illustrating a method 1800 that supports feedback for multicast and broadcast messages in accordance with aspects of the present disclosure. The operations of method 1800 may be implemented by a base station 105 or its components. For example, the operations of method 1800 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, an indication of a configuration for a set of TTIs associated with an occasion for uplink acknowledgment feedback, the set of TTIs including at least a first TTI allocated for unicast downlink data for the UE and at least a second TTI allocated for multicast downlink data for the UE. The operations of 1805 may be performed according to the methods described herein. In some examples, aspects of the operations of 1805 may be performed by a TTI allocation component as described with reference to FIGS. 11-14.

At 1810, the base station may transmit, to the UE, a unicast downlink data message in the first TTI. The operations of 1810 may be performed according to the methods described herein. In some examples, aspects of the operations of 1810 may be performed by a unicast transmission component as described with reference to FIGS. 11-14.

At 1815, the base station may receive, from the UE in the occasion for uplink acknowledgment feedback and in response to the unicast downlink data message, a feedback message including acknowledgment information according to an acknowledgment codebook that includes TTIs allocated for unicast downlink data, including the first TTI, and excludes TTIs allocated for multicast downlink data, including the second TTI. The operations of 1815 may be performed according to the methods described herein. In some examples, aspects of the operations of 1815 may be performed by a feedback reception component as described with reference to FIGS. 11-14.

Figure 19:
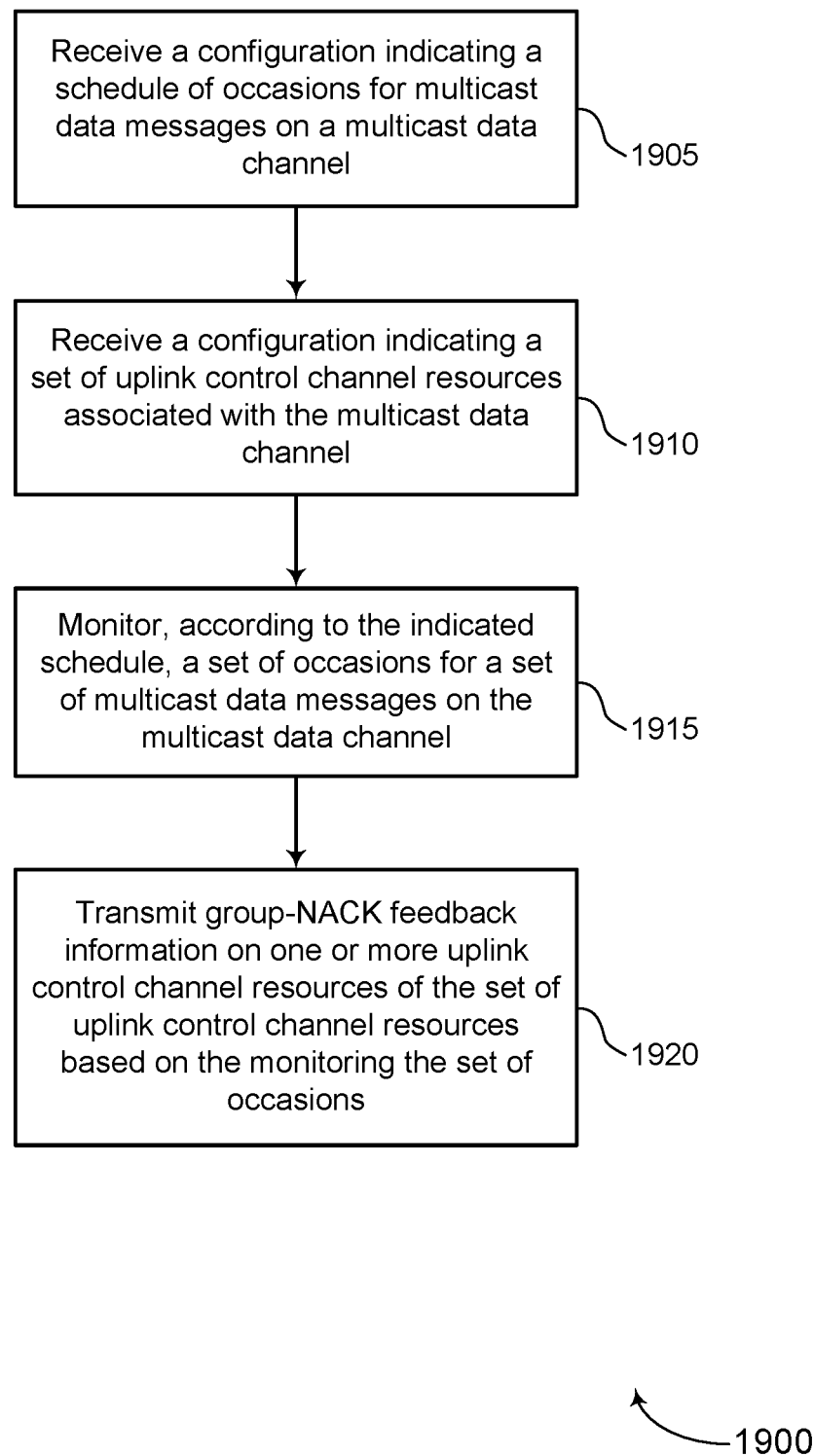

FIG. 19 shows a flowchart illustrating a method 1900 that supports feedback for multicast and broadcast messages in accordance with aspects of the present disclosure. The operations of method 1900 may be implemented by a UE 115 or its components. For example, the operations of method 1900 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1905, the UE may receive, from a base station, a configuration indicating a schedule of occasions for multicast data messages on a multicast data channel. The operations of 1905 may be performed according to the methods described herein. In some examples, aspects of the operations of 1905 may be performed by a multicast scheduling component as described with reference to FIGS. 7-10.

At 1910, the UE may receive, from the base station, a configuration indicating a set of uplink control channel resources associated with the multicast data channel. The operations of 1910 may be performed according to the methods described herein. In some examples, aspects of the operations of 1910 may be performed by an uplink resource component as described with reference to FIGS. 7-10.

At 1915, the UE may monitor, according to the indicated schedule, a set of occasions for a set of multicast data messages on the multicast data channel. The operations of 1915 may be performed according to the methods described herein. In some examples, aspects of the operations of 1915 may be performed by a monitoring component as described with reference to FIGS. 7-10.

At 1920, the UE may transmit, to the base station, group-NACK feedback information on one or more uplink control channel resources of the set of uplink control channel resources based on the monitoring the set of occasions. The operations of 1920 may be performed according to the methods described herein. In some examples, aspects of the operations of 1920 may be performed by a group-NACK component as described with reference to FIGS. 7-10.

Figure 20:
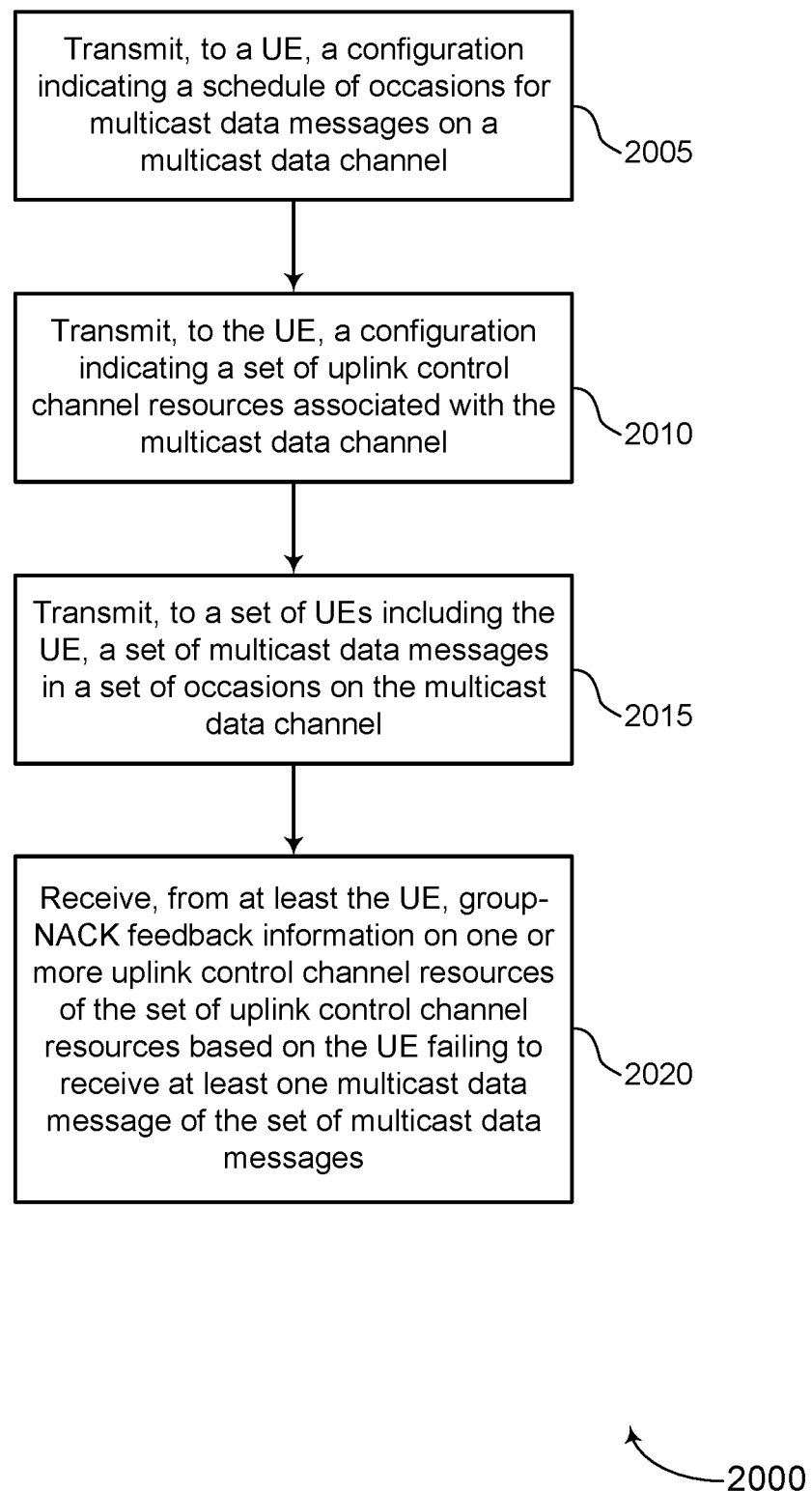

FIG. 20 shows a flowchart illustrating a method 2000 that supports feedback for multicast and broadcast messages in accordance with aspects of the present disclosure. The operations of method 2000 may be implemented by a base station 105 or its components. For example, the operations of method 2000 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a configuration indicating a schedule of occasions for multicast data messages on a multicast data channel. The operations of 2005 may be performed according to the methods described herein. In some examples, aspects of the operations of 2005 may be performed by a multicast scheduling component as described with reference to FIGS. 11-14.

At 2010, the base station may transmit, to the UE, a configuration indicating a set of uplink control channel resources associated with the multicast data channel. The operations of 2010 may be performed according to the methods described herein. In some examples, aspects of the operations of 2010 may be performed by an uplink resource component as described with reference to FIGS. 11-14.

At 2015, the base station may transmit, to a set of UEs including the UE, a set of multicast data messages in a set of occasions on the multicast data channel. The operations of 2015 may be performed according to the methods described herein. In some examples, aspects of the operations of 2015 may be performed by a multicast transmission component as described with reference to FIGS. 11-14.

At 2020, the base station may receive, from at least the UE, group-NACK feedback information on one or more uplink control channel resources of the set of uplink control channel resources based on the UE failing to receive at least one multicast data message of the set of multicast data messages. The operations of 2020 may be performed according to the methods described herein. In some examples, aspects of the operations of 2020 may be performed by a group-NACK component as described with reference to FIGS. 11-14.

Figure 21:
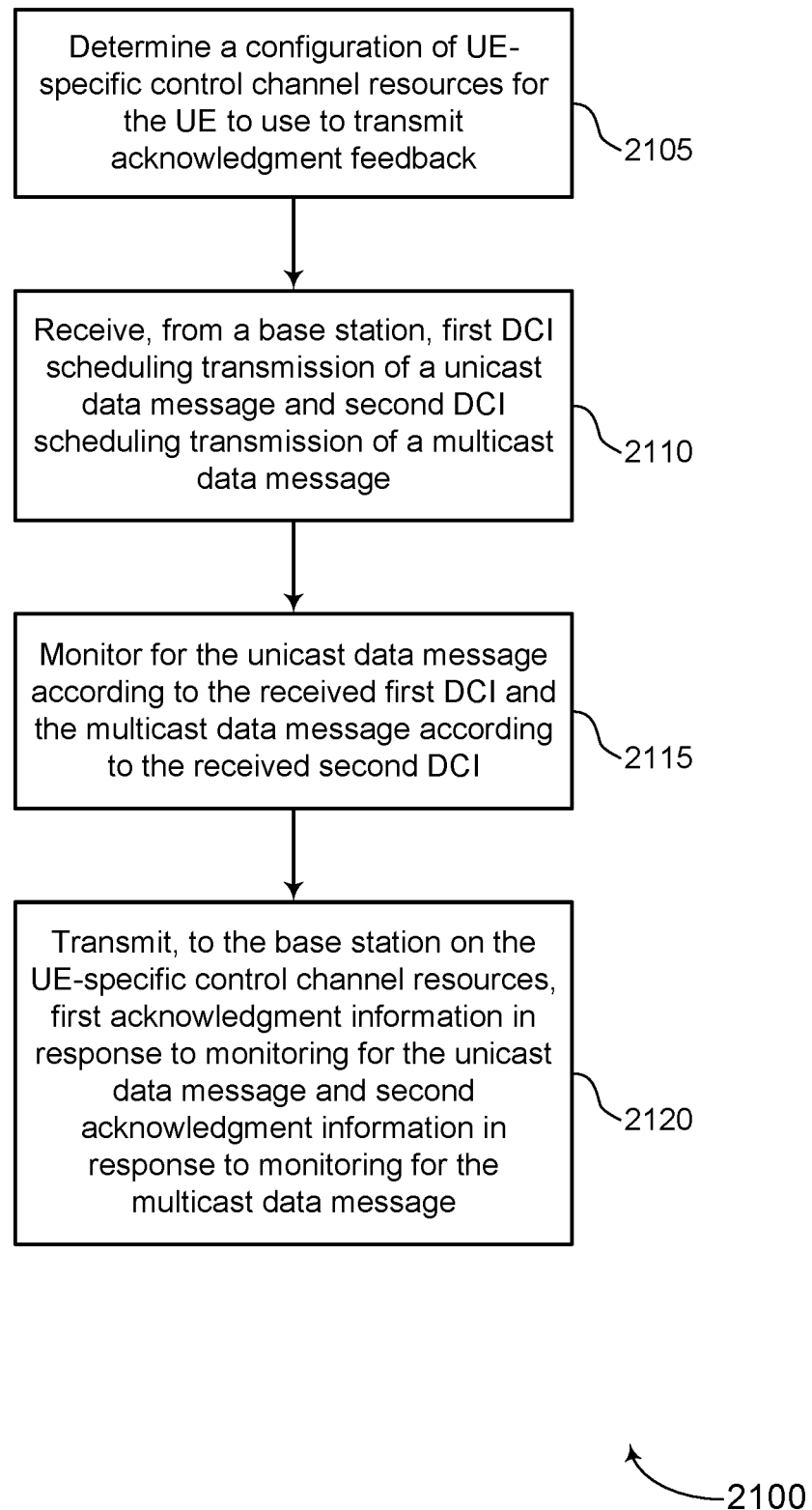

FIG. 21 shows a flowchart illustrating a method 2100 that supports feedback for multicast and broadcast messages in accordance with aspects of the present disclosure. The operations of method 2100 may be implemented by a UE 115 or its components. For example, the operations of method 2100 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 2105, the UE may determine a configuration of UE-specific control channel resources for the UE to use to transmit acknowledgment feedback. The operations of 2105 may be performed according to the methods described herein. In some examples, aspects of the operations of 2105 may be performed by a UE-specific configuration component as described with reference to FIGS. 7-10.

At 2110, the UE may receive, from a base station, first DCI scheduling transmission of a unicast data message and second DCI scheduling transmission of a multicast data message. The operations of 2110 may be performed according to the methods described herein. In some examples, aspects of the operations of 2110 may be performed by a DCI reception component as described with reference to FIGS. 7-10.

At 2115, the UE may monitor for the unicast data message according to the received first DCI and the multicast data message according to the received second DCI. The operations of 2115 may be performed according to the methods described herein. In some examples, aspects of the operations of 2115 may be performed by a monitoring component as described with reference to FIGS. 7-10.

At 2120, the UE may transmit, to the base station on the UE-specific control channel resources, first acknowledgment information in response to monitoring for the unicast data message and second acknowledgment information in response to monitoring for the multicast data message. The operations of 2120 may be performed according to the methods described herein. In some examples, aspects of the operations of 2120 may be performed by a feedback component as described with reference to FIGS. 7-10.

Figure 22:
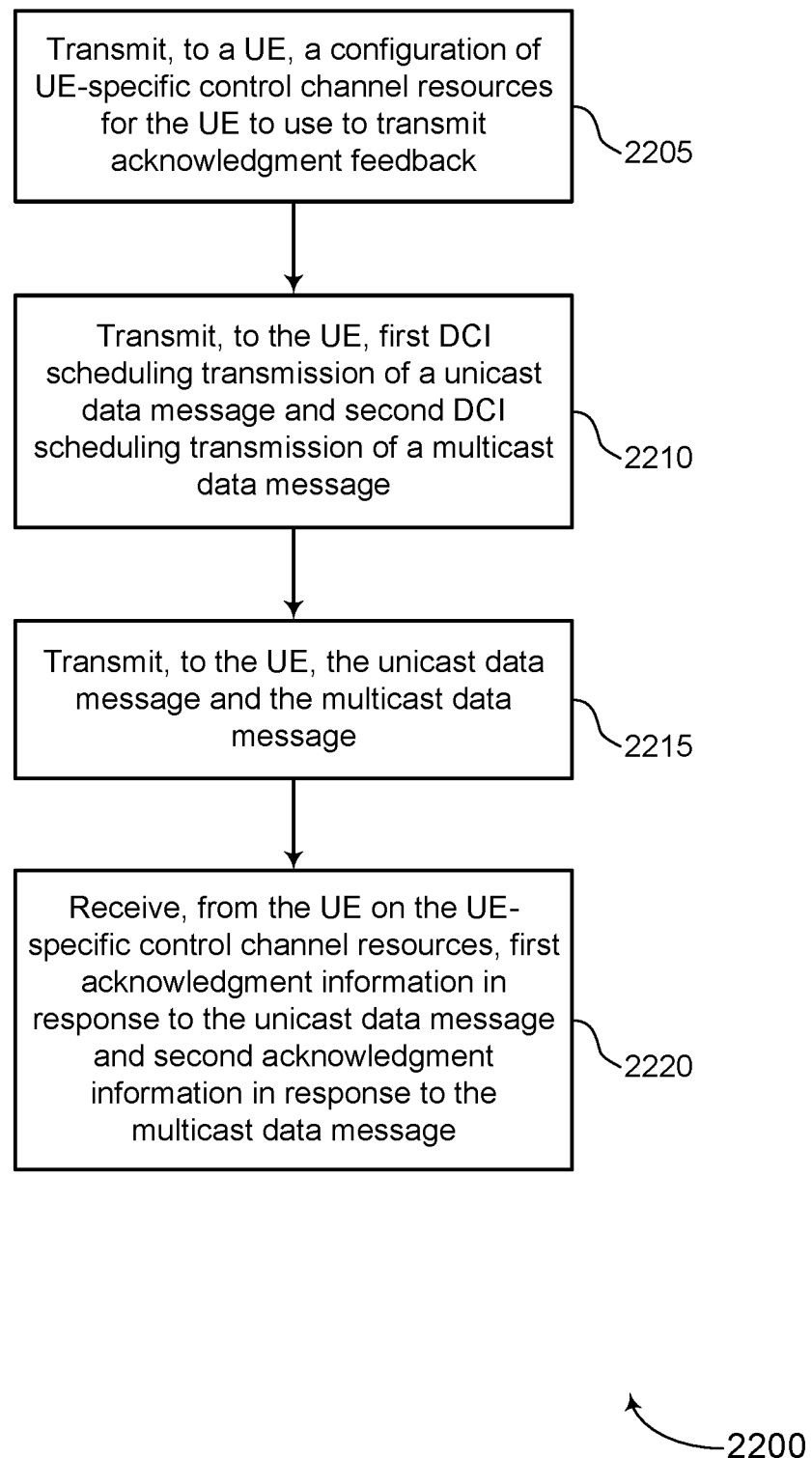

FIG. 22 shows a flowchart illustrating a method 2200 that supports feedback for multicast and broadcast messages in accordance with aspects of the present disclosure. The operations of method 2200 may be implemented by a base station 105 or its components. For example, the operations of method 2200 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2205, the base station may transmit, to a UE, a configuration of UE-specific control channel resources for the UE to use to transmit acknowledgment feedback. The operations of 2205 may be performed according to the methods described herein. In some examples, aspects of the operations of 2205 may be performed by a UE-specific configuration component as described with reference to FIGS. 11-14.

At 2210, the base station may transmit, to the UE, first DCI scheduling transmission of a unicast data message and second DCI scheduling transmission of a multicast data message. The operations of 2210 may be performed according to the methods described herein. In some examples, aspects of the operations of 2210 may be performed by a DCI transmission component as described with reference to FIGS. 11-14.

At 2215, the base station may transmit, to the UE, the unicast data message and the multicast data message. The operations of 2215 may be performed according to the methods described herein. In some examples, aspects of the operations of 2215 may be performed by a transmission component as described with reference to FIGS. 11-14.

At 2220, the base station may receive, from the UE on the UE-specific control channel resources, first acknowledgment information in response to the unicast data message and second acknowledgment information in response to the multicast data message. The operations of 2220 may be performed according to the methods described herein. In some examples, aspects of the operations of 2220 may be performed by a feedback reception component as described with reference to FIGS. 11-14.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. An apparatus for wireless communications at a user equipment (UE), comprising:
   one or more processors;
   one or more memories coupled with the one or more processors; and
   one or more processor-readable instructions stored in the one or more memories and executable by the one or more processors, individually or collectively, to cause the apparatus to:
   receive, from a network device via a first downlink channel, a message indicating an acknowledgment feedback configuration for multicast messages;
   receive, from the network device via the first downlink channel, a downlink control information message that is associated with scheduling the multicast messages, the downlink control information message comprising an indication that configures whether the UE is enabled to provide acknowledgment feedback for the multicast messages in accordance with the acknowledgment feedback configuration;
   receive, from the network device via a second downlink channel, a multicast data message; and
   transmit, to the network device via an uplink channel, an acknowledgment feedback message in accordance with the acknowledgment feedback configuration, the acknowledgment feedback message being transmitted in response to the received multicast data message based at least in part on the received downlink control information message comprising the indication that configures whether the UE is enabled to provide the acknowledgment feedback for the multicast messages.

2. The apparatus of claim 1, wherein the instructions are further executable by the one or more processors to cause the apparatus to enable the acknowledgment feedback for the multicast messages for a service based at least in part on the indication of the downlink control information message being specific to the service, wherein the acknowledgment feedback message is transmitted based at least in part on the received multicast data message being associated with the service.

3. The apparatus of claim 2, wherein the service comprises a first service, and the instructions are further executable by the one or more processors to cause the apparatus to:
   determine that second acknowledgment feedback is disabled for second multicast messages for a second service;
   receive, from the network device, a second multicast data message for the second service; and
   refrain from transmitting a second acknowledgment feedback message in response to the second multicast data message for the second service based at least in part on determining that the second acknowledgment feedback is disabled for the second multicast messages for the second service.

4. The apparatus of claim 1, wherein the instructions to receive the indication of the downlink control information message are executable by the one or more processors to cause the apparatus to receive, from the network device, a UE-specific configuration message comprising the indication of the downlink control information message.

5. The apparatus of claim 4, wherein the instructions are further executable by the one or more processors to cause the apparatus to transmit one or both of a UE measurement report or a unicast channel state information report, wherein the UE-specific configuration message is based at least in part on the one or both of the UE measurement report or the unicast channel state information report.

6. The apparatus of claim 1, wherein the instructions to receive the indication of the downlink control information message are executable by the one or more processors to cause the apparatus to receive, from the network device on a multicast control channel, a multicast configuration message comprising the indication of the downlink control information message, wherein the indication of the downlink control information message is for a set of UEs and the multicast data message is addressed to the set of UEs, and wherein the acknowledgment feedback configuration comprises the multicast configuration message.

7. The apparatus of claim 1, wherein the indication of the downlink control information message comprises one or more of a service-based criterion, a multicast reference signal receive power threshold, an antenna configuration-specific threshold, or a probability for enabling the acknowledgment feedback for the multicast messages.

8. The apparatus of claim 1, wherein the instructions are further executable by the one or more processors to cause the apparatus to enable the acknowledgment feedback for the multicast messages for a service corresponding to a group radio network temporary identifier based at least in part on the received downlink control information message comprising the indication that configures whether the UE is enabled to provide the acknowledgment feedback for the multicast messages.

9. The apparatus of claim 8, wherein the instructions are further executable by the one or more processors to cause the apparatus to monitor for the multicast data message via a channel corresponding to the group radio network temporary identifier, wherein the multicast data message is received based at least in part on the monitoring.

10. The apparatus of claim 3, wherein, to determine that the acknowledgment feedback is disabled for the multicast messages for the second service, the instructions are executable by the one or more processors to cause the apparatus to:
    determine that the acknowledgment feedback is disabled for the multicast messages for the second service based at least in part on the received downlink control information message comprising the indication that configures whether the UE is enabled to provide the acknowledgment feedback for the multicast messages.

11. A method for wireless communications at a user equipment (UE), comprising:
    receiving, from a network device via a first downlink channel, a message indicating an acknowledgment feedback configuration for multicast messages;
    receiving, from the network device via the first downlink channel, a downlink control information message that is associated with scheduling the multicast messages, the downlink control information message comprising an indication that configures whether the UE is enabled to provide acknowledgment feedback for multicast messages in accordance with the acknowledgment feedback configuration;
    receiving, from the network device via a second downlink channel, a multicast data message; and transmitting, to the network device via an uplink channel, an acknowledgment feedback message in accordance with the acknowledgment feedback configuration, the acknowledgment feedback message being transmitted in response to the received multicast data message based at least in part on the received downlink control information message comprising the indication that configures whether the UE is enabled to provide the acknowledgment feedback for the multicast messages.

12. The method of claim 11, further comprising enabling the acknowledgment feedback for the multicast messages for a service based at least in part on the downlink control information message being specific to the service, wherein the acknowledgment feedback message is transmitted based at least in part on the received multicast data message being associated with the service.

13. The method of claim 12, wherein the service comprises a first service, the method further comprising:
  determining that second acknowledgment feedback is disabled for second multicast messages for a second service;
  receiving, from the network device, a second multicast data message for the second service; and
  refraining from transmitting a second acknowledgment feedback message in response to the second multicast data message for the second service based at least in part on determining that the second acknowledgment feedback is disabled for the second multicast messages for the second service.

14. The method of claim 11, wherein receiving the indication of the downlink control information message comprises receiving, from the network device, a UE-specific configuration message comprising the indication of the downlink control information message.

15. The method of claim 14, further comprising transmitting one or both of a UE measurement report or a unicast channel state information report, wherein the UE-specific configuration message is based at least in part on the one or both of the UE measurement report or the unicast channel state information report.

16. The method of claim 11, wherein receiving the indication of the downlink control information message comprises receiving, from the network device on a multicast control channel, a multicast configuration message comprising the indication of the downlink control information message, wherein the indication of the downlink control information message is for a set of UEs and the multicast data message is addressed to the set of UEs, and wherein the acknowledgment feedback configuration comprises the multicast configuration message.

17. The method of claim 11, wherein the downlink control information message comprises one or more of a service-based criterion, a multicast reference signal receive power threshold, an antenna configuration-specific threshold, or a probability for enabling the acknowledgment feedback for the multicast messages.

18. The method of claim 11, further comprising enabling the acknowledgment feedback for the multicast messages for a service corresponding to a group radio network temporary identifier based at least in part on the received downlink control information message comprising the indication that configures whether the UE is enabled to provide the acknowledgment feedback for the multicast messages.

19. The method of claim 18, further comprising monitoring for the multicast data message via a channel corresponding to the group radio network temporary identifier, wherein the multicast data message is received based at least in part on the monitoring.

20. The method of claim 13, wherein determining that the acknowledgment feedback is disabled for the multicast messages for the second service comprises:
  determining that the acknowledgment feedback is disabled for the multicast messages for the second service based at least in part on the received downlink control information message comprising the indication that configures whether the UE is enabled to provide the acknowledgment feedback for the multicast messages.

21. A non-transitory computer-readable medium storing code for wireless communications at user equipment (UE), the code comprising instructions executable by one or more processors to:
  receive, from a network device via a first downlink channel, a message indicating an acknowledgment feedback configuration for multicast messages;
  receive, from the network device via the first downlink channel, a downlink control information message that is associated with scheduling the multicast messages, the downlink control information message comprising an indication that configures whether the UE is enabled to provide acknowledgment feedback for multicast messages in accordance with the acknowledgment feedback configuration;
  receive, from the network device via a second downlink channel, a multicast data message; and
  transmit, to the network device via an uplink channel, an acknowledgment feedback message in accordance with the acknowledgment feedback configuration, the acknowledgment feedback message being transmitted in response to the received multicast data message based at least in part on the received downlink control information message comprising the indication that configures whether the UE is enabled to provide the acknowledgment feedback for the multicast messages.

22. The non-transitory computer-readable medium of claim 21, wherein the instructions are further executable by the one or more processors to enable the acknowledgment feedback for the multicast messages for a service based at least in part on the indication of the downlink control information message being specific to the service, wherein the acknowledgment feedback message is transmitted based at least in part on the received multicast data message being associated with the service.

23. The non-transitory computer-readable medium of claim 22, wherein the service comprises a first service, and the instructions are further executable by the one or more processors to:
  determine that second acknowledgment feedback is disabled for second multicast messages for a second service;
  receive, from the network device, a second multicast data message for the second service; and
  refrain from transmitting a second acknowledgment feedback message in response to the multicast data message for the second service based at least in part on determining that the second acknowledgment feedback is disabled for the second multicast messages for the second service.

24. The non-transitory computer-readable medium of claim 21, wherein the instructions to receive the indication of the downlink control information message are executable by the one or more processors to receive, from the network device, a UE-specific configuration message comprising the indication of the downlink control information message.

25. The non-transitory computer-readable medium of claim 24, wherein the instructions are further executable by the one or more processors to transmit one or both of a UE measurement report or a unicast channel state information report, wherein the UE-specific configuration message is based at least in part on one or both of the UE measurement report or the unicast channel state information report.

26. The non-transitory computer-readable medium of claim 21, wherein the instructions to receive the indication of the downlink control information message are executable by the one or more processors to receive, from the network device on a multicast control channel, a multicast configuration message comprising the indication of the downlink control information message, wherein the indication of the downlink control information message is for a set of UEs and the multicast data message is addressed to the set of UEs, and wherein the acknowledgment feedback configuration comprises the multicast configuration message.

27. The non-transitory computer-readable medium of claim 21, wherein the downlink control information message comprises one or more of a service-based criterion, a multicast reference signal receive power threshold, an antenna configuration-specific threshold, or a probability for enabling the acknowledgment feedback for the multicast messages.

28. The non-transitory computer-readable medium of claim 23, wherein, to determine that the acknowledgment feedback is disabled for the multicast messages for the second service, the instructions are executable by the one or more processors to:
determine that the acknowledgment feedback is disabled for the multicast messages for the second service based at least in part on the received downlink control information message comprising the indication that configures whether the UE is enabled to provide the acknowledgment feedback for the multicast messages.

* * * * *